US012745188B2

(12) United States Patent
Yuan et al.

(10) Patent No.: US 12,745,188 B2
(45) Date of Patent: Sep. 22, 2026

(54) POWER CONTROL PARAMETERS FOR WIRELESS COMMUNICATION

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 18/567,193

(22) PCT Filed: Aug. 6, 2021

(86) PCT No.: PCT/CN2021/111159
§ 371 (c)(1),
(2) Date: Dec. 5, 2023

(87) PCT Pub. No.: WO2023/010519
PCT Pub. Date: Feb. 9, 2023

(65) Prior Publication Data
US 2024/0276389 A1 Aug. 15, 2024

(51) Int. Cl.
*H04W 52/18* (2009.01)
*H04W 52/54* (2009.01)

(52) U.S. Cl.
CPC ........... *H04W 52/18* (2013.01); *H04W 52/54* (2013.01)

(58) Field of Classification Search
CPC .............................. H04W 52/18; H04W 52/54
See application file for complete search history.

(56) References Cited

U.S. PATENT DOCUMENTS 11,528,665 B2 * 12/2022 Zhou ........................ H04L 5/001
11,563,531 B2 * 1/2023 Zhou ..................... H04L 5/0023
(Continued)

FOREIGN PATENT DOCUMENTS

EP 4224904 A1 * 8/2023 ............. H04B 7/022
EP 4412281 A1 * 8/2024 ........... H04L 5/0048
(Continued)

OTHER PUBLICATIONS

International Search Report and Written Opinion—PCT/CN2021/111159—ISA/EPO—Apr. 24, 2022.
(Continued)

*Primary Examiner* — Hai V Nguyen
(74) *Attorney, Agent, or Firm* — Loza & Loza, LLP

(57) ABSTRACT

Aspects relate to identifying power control parameters for a transmission on a bandwidth part (BWP) and component carrier (CC). In some examples, a user equipment (UE) identifies power control (PC) parameters to be used for a first BWP and CC when a common set of transmission configuration indicator (TCI) states is configured for a reference BWP and CC, and where the common set of TCI states is shared at least between the reference BWP and CC and the first BWP and CC. For example, the UE may transmit a transmission using PC parameters that are identified based on a first TCI state identifier (ID) for the common set of TCI states. In some examples, a UE identifies PC parameters to be used for a BWP and CC based on whether a path loss reference signal is configured for a TCI state on a reference BWP and CC.

30 Claims, 14 Drawing Sheets

(56) References Cited

U.S. PATENT DOCUMENTS

| | | | | |
|---|---|---|---|---|
| 11,791,915 | B2 * | 10/2023 | Jin | H04B 17/347 370/252 |
| 11,864,128 | B2 * | 1/2024 | Zhang | H04W 74/0841 |
| 11,937,098 | B2 * | 3/2024 | Zhang | H04B 7/022 |
| 12,052,691 | B2 * | 7/2024 | Khoshnevisan | H04W 72/02 |
| 12,096,378 | B2 * | 9/2024 | Zhang | H04B 7/0695 |
| 12,376,040 | B2 * | 7/2025 | Liu | H04W 52/146 |
| 12,471,028 | B2 * | 11/2025 | Matsumura | H04W 52/242 |
| 12,489,582 | B2 * | 12/2025 | Awoniyi-Oteri | H04L 5/0053 |
| 12,490,197 | B2 * | 12/2025 | Wang | H04W 52/383 |
| 12,495,434 | B2 * | 12/2025 | Bai | H04L 5/0091 |
| 12,500,644 | B2 * | 12/2025 | Svedman | H04B 7/0689 |
| 2020/0351039 | A1 * | 11/2020 | Zhou | H04L 5/0023 |
| 2021/0120500 | A1 * | 4/2021 | Zhou | H04L 5/001 |
| 2022/0248336 | A1 * | 8/2022 | Matsumura | H04W 52/10 |
| 2022/0272706 | A1 * | 8/2022 | Sengupta | H04W 52/18 |
| 2022/0303788 | A1 * | 9/2022 | Zhang | H04B 7/0404 |
| 2022/0312338 | A1 * | 9/2022 | Matsumura | H04W 52/146 |
| 2022/0330163 | A1 * | 10/2022 | Liu | H04W 52/146 |
| 2023/0114010 | A1 * | 4/2023 | Zhu | H04W 56/001 370/329 |
| 2023/0179281 | A1 * | 6/2023 | Svedman | H04B 7/0689 455/101 |
| 2023/0239096 | A1 * | 7/2023 | Go | H04L 5/0098 370/329 |
| 2023/0291533 | A1 * | 9/2023 | Zhou | H04B 7/088 |
| 2023/0362665 | A1 * | 11/2023 | Xiao | H04L 5/0035 |
| 2023/0370238 | A1 * | 11/2023 | Liu | H04B 7/0639 |
| 2023/0379835 | A1 * | 11/2023 | Matsumura | H04W 52/54 |
| 2023/0379902 | A1 * | 11/2023 | Matsumura | H04B 7/0695 |
| 2024/0014880 | A1 * | 1/2024 | Svedman | H04B 7/06968 |
| 2024/0039582 | A1 * | 2/2024 | Shahmohammadian | H04W 72/23 |
| 2024/0040652 | A1 * | 2/2024 | Shahmohammadian | H04B 7/022 |
| 2024/0196387 | A1 * | 6/2024 | Yuan | H04L 5/0092 |
| 2024/0204851 | A1 * | 6/2024 | Yuan | H04B 7/0695 |
| 2024/0224192 | A1 * | 7/2024 | Yuan | H04W 52/54 |
| 2024/0292339 | A1 * | 8/2024 | Zhou | H04W 52/146 |
| 2024/0314697 | A1 * | 9/2024 | Wang | H04W 92/18 |
| 2024/0333369 | A1 * | 10/2024 | Yuan | H04L 5/0023 |
| 2024/0340914 | A1 * | 10/2024 | Lin | H04W 16/28 |
| 2024/0413859 | A1 * | 12/2024 | Yuan | H04B 7/06956 |
| 2025/0007666 | A1 * | 1/2025 | Tsai | H04W 74/0836 |
| 2025/0008453 | A1 * | 1/2025 | Kung | H04W 56/001 |
| 2025/0015870 | A1 * | 1/2025 | Huang | H04W 76/20 |
| 2025/0016871 | A1 * | 1/2025 | Huang | H04B 17/328 |
| 2025/0016872 | A1 * | 1/2025 | Zhang | H04W 76/20 |
| 2025/0088333 | A1 * | 3/2025 | Zhu | H04L 5/0094 |
| 2025/0088970 | A1 * | 3/2025 | Liu | H04W 52/325 |
| 2025/0096997 | A1 * | 3/2025 | Zhang | H04L 5/0091 |
| 2025/0119955 | A1 * | 4/2025 | Huang | H04W 72/23 |
| 2025/0133623 | A1 * | 4/2025 | Yuan | H04L 5/0048 |
| 2025/0234299 | A1 * | 7/2025 | Yuan | H04W 52/146 |
| 2025/0261126 | A1 * | 8/2025 | Yuan | H04W 52/248 |
| 2025/0280370 | A1 * | 9/2025 | Yuan | H04W 52/365 |
| 2025/0351088 | A1 * | 11/2025 | Yuan | H04L 5/0023 |
| 2025/0351153 | A1 * | 11/2025 | Go | H04B 7/06968 |
| 2025/0386300 | A1 * | 12/2025 | Liu | H04W 52/146 |

FOREIGN PATENT DOCUMENTS

| | | | | | |
|---|---|---|---|---|---|
| EP | 4429304 | A1 * | 9/2024 | H04W 76/19 |
| EP | 4429305 | A1 * | 9/2024 | H04L 5/0094 |
| EP | 4486035 | A1 * | 1/2025 | H04B 7/06968 |
| WO | WO-2023023928 | A1 * | 3/2023 | H04B 7/088 |
| WO | WO-2023053098 | A1 * | 4/2023 | H04L 5/0055 |
| WO | WO-2023053408 | A1 * | 4/2023 | H04L 5/0048 |

OTHER PUBLICATIONS

Samsung: "Moderator Summary for Multi-Beam Enhancement: Round 1", 3GPP TSG RAN WG1 #105-e, R1-2106086, e-Meeting, 20210510-20210527, 17 Pages, May 21, 2021(May 21, 2021) the whole document.

ZTE: "Enhancements on Multi-beam Operation", 3GPP TSG RAN WG1 Meeting #103-e, R1-2007763, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, XP051946497, 19 Pages, Retrieved on Oct. 24, 2020, Section 2, Sections 2.1.2, 2.2.2, 2.2.3, 2.4, p. 1-p. 5.

ZTE: "Further Details on Multi-Beam and Multi-TRP Operation", 3GPP TSG RAN WG1 Meeting #102-e, R1-2005461, Aug. 28, 2020 (Aug. 28, 2020), 8 Pages, Section 2.

* cited by examiner

Reference BWP/CC 502
(e.g., BWP1/CC1)

504
Common TCI State Pool
TCI State 1 Configuration
TCI State 2 Configuration

514
PC Parameters
(except PL RS)
PC Parameter (Set) 1
PC Parameter (Set) 2

516
PC Parameters
(PL RS)
PL RS 1
PL RS 2

BWP2/CC2 506

510
Configured to use Common TCI State Pool of Reference BWP/CC

BWP3/CC3 508

512
Configured to use Common TCI State Pool of Reference BWP/CC

POWER CONTROL PARAMETERS FOR WIRELESS COMMUNICATION

CROSS-REFERENCE TO RELATED APPLICATION(S)

This application is the U.S. national stage of PCT patent application number PCT/CN2021/111159 filed on Aug. 6, 2021.

TECHNICAL FIELD

The technology discussed below relates generally to wireless communication and, more particularly, to selecting power control parameters for a transmission when a set of transmission configuration indicator (TCI) states is shared across bandwidth parts and component carriers.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS.

A BS may schedule access to a cell to support access by multiple UEs. For example, a BS may allocate different resources (e.g., time domain and frequency domain resources) for different UEs operating within a cell of the BS. In addition, in a scenario where a UE supports multiple radio frequency (RF) carriers, the BS may schedule the UE on one or more RF carriers.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a user equipment may include a transceiver, a memory, and a processor coupled to the transceiver and the memory. The processor and the memory may be configured to receive from a base station via the transceiver information identifying a set of transmission configuration indicator (TCI) states configured to be shared by a plurality of bandwidth parts (BWPs) and component carriers (CCs) including a reference bandwidth part (BWP) and component carrier (CC), and receive from the base station via the transceiver scheduling information for a transmission. The scheduling information may include a first TCI state identifier (ID) for the set of TCI states. The processor and the memory may also be configured to transmit the transmission to the base station via the transceiver according to a first set of power control parameters identified based on the first TCI state ID.

In some examples, a method for wireless communication at a user equipment is disclosed. The method may include receiving from a base station information identifying a set of transmission configuration indicator (TCI) states configured to be shared by a plurality of bandwidth parts (BWPs) and component carriers (CCs) including a reference BWP and CC, and receiving from the base station scheduling information for a transmission. The scheduling information may include a first TCI state identifier (ID) for the set of TCI states. The method may also include transmitting the transmission to the base station according to a first set of power control parameters identified based on the first TCI state ID.

In some examples, a user equipment may include means for receiving from a base station information identifying a set of transmission configuration indicator (TCI) states configured to be shared by a plurality of bandwidth parts (BWPs) and component carriers (CCs) including a reference BWP and CC, and means for receiving from the base station scheduling information for a transmission. The scheduling information may include a first TCI state identifier (ID) for the set of TCI states. The user equipment may also include means for transmitting the transmission to the base station according to a first set of power control parameters identified based on the first TCI state ID.

In some examples, an article of manufacture for use by a user equipment includes a non-transitory computer-readable medium having stored therein instructions executable by one or more processors of the user equipment to receive from a base station information identifying a set of transmission configuration indicator (TCI) states configured to be shared by a plurality of bandwidth parts (BWPs) and component carriers (CCs) including a reference BWP and CC, and receive from the base station scheduling information for a transmission. The scheduling information may include a first TCI state identifier (ID) for the set of TCI states. The computer-readable medium may also have stored therein instructions executable by one or more processors of the user equipment to transmit the transmission to the base station according to a first set of power control parameters identified based on the first TCI state ID.

In some examples, a user equipment may include a transceiver, a memory, and a processor coupled to the transceiver and the memory. The processor and the memory may be configured to receive from a base station via the transceiver information identifying a set of transmission configuration indicator (TCI) states configured to be shared by a plurality of bandwidth parts (BWPs) and component carriers (CCs) including a reference BWP and CC, and receive from the base station via the transceiver scheduling information for a transmission. The scheduling information may include a first TCI state identifier (ID) for the set of TCI states. The processor and the memory may also be configured to transmit the transmission to the base station via the transceiver according to a first power control parameter identified based on whether a path loss reference signal (PL RS) parameter is configured for the first TCI state ID for the reference BWP and CC.

In some examples, a method for wireless communication at a user equipment is disclosed. The method may include receiving from a base station information identifying a set of transmission configuration indicator (TCI) states configured to be shared by a plurality of bandwidth parts (BWPs) and component carriers (CCs) including a reference BWP and CC, and receiving from the base station scheduling information for a transmission. The scheduling information may include a first TCI state identifier (ID) for the set of TCI states. The method may also include transmitting the transmission to the base station according to a first power control parameter identified based on whether a path loss reference signal (PL RS) parameter is configured for the first TCI state ID for the reference BWP and CC.

In some examples, a user equipment may include means for receiving from a base station information identifying a set of transmission configuration indicator (TCI) states configured to be shared by a plurality of bandwidth parts (BWPs) and component carriers (CCs) including a reference BWP and CC, and means for receiving from the base station scheduling information for a transmission. The scheduling information may include a first TCI state identifier (ID) for the set of TCI states. The user equipment may also include means for transmitting the transmission to the base station according to a first power control parameter identified based on whether a path loss reference signal (PL RS) parameter is configured for the first TCI state ID for the reference BWP and CC.

In some examples, an article of manufacture for use by a user equipment includes a non-transitory computer-readable medium having stored therein instructions executable by one or more processors of the user equipment to receive from a base station information identifying a set of transmission configuration indicator (TCI) states configured to be shared by a plurality of bandwidth parts (BWPs) and component carriers (CCs) including a reference BWP and CC, and receive from the base station scheduling information for a transmission. The scheduling information may include a first TCI state identifier (ID) for the set of TCI states. The computer-readable medium may also have stored therein instructions executable by one or more processors of the user equipment to transmit the transmission to the base station according to a first power control parameter identified based on whether a path loss reference signal (PL RS) parameter is configured for the first TCI state ID for the reference BWP and CC.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
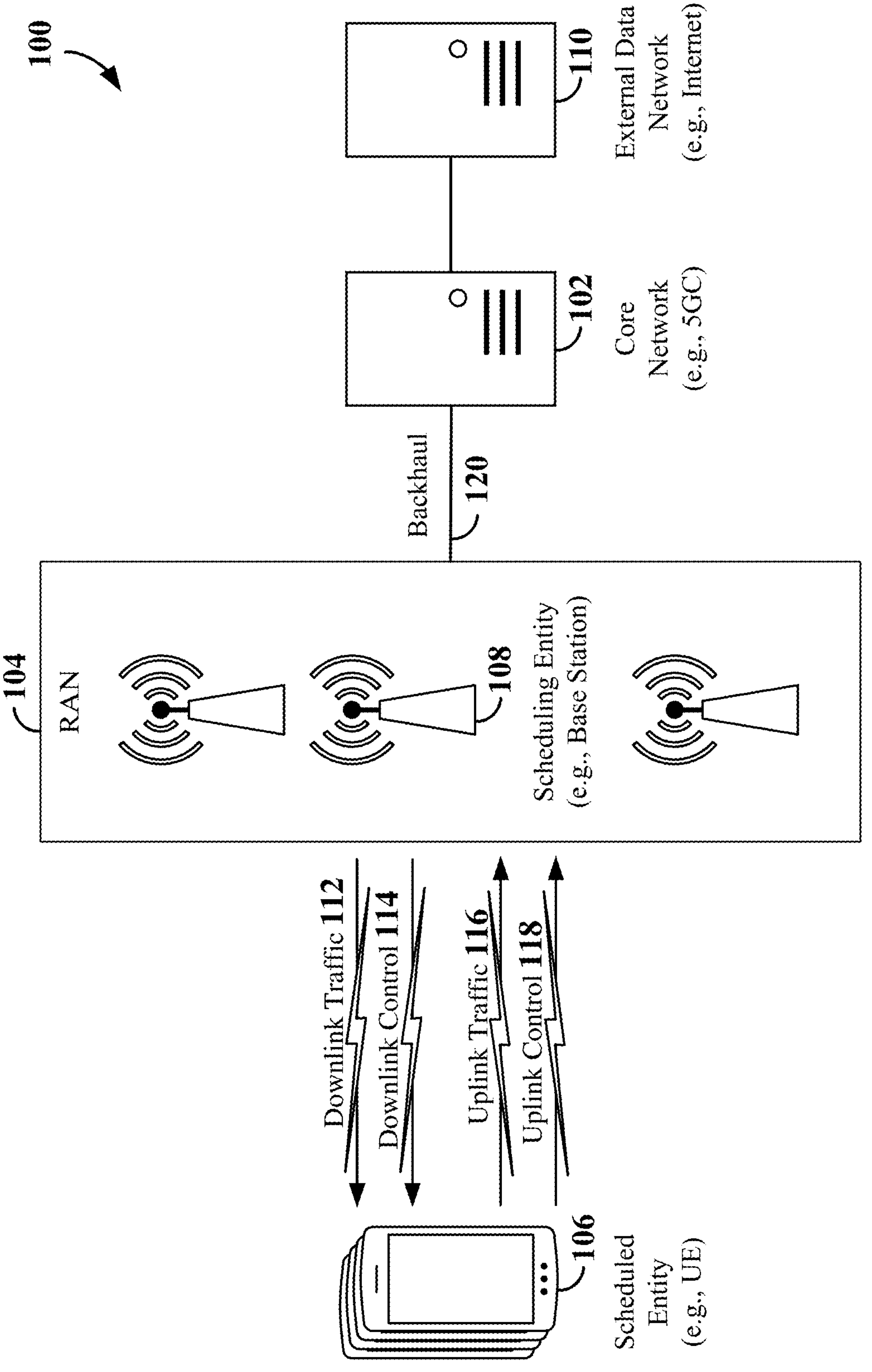
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The disclosure relates in some aspects to techniques for a user equipment (UE) to identify power control parameters to be used for a transmission on a bandwidth part (BWP) and component carrier (CC). In some examples, the power control parameters may include a $P_O$ parameter (e.g., a target signal-to-interference-and-noise ratio parameter), an $\alpha$ parameter (e.g., a path loss compensation factor), an 1 parameter (e.g., a closed loop index), and a path loss reference signal (PL RS) parameter for an uplink power control algorithm.

A base station and a UE may support several transmission configuration indicator (TCI) states. A set of TCI states may be referred to as a TCI state pool or a TCI state list. To reduce signaling overhead, a base station may configure a common TCI state pool for multiple BWPs and CCs. For example, the base station may designate a BWP and CC as a reference BWP and CC and configure the reference BWP and CC with a particular common TCI state pool. Here, the term common TCI state pool indicates that the TCI state pool is shared across multiple BWPs and CCs.

The disclosure relates in some aspects to identifying power control parameters to be used for a particular BWP and CC when a common TCI state pool is configured for that BWP and CC. In some examples, a UE may be configured to use power control parameters (e.g., $P_O$, $\alpha$, and a closed loop index) associated with the reference BWP and CC. In some examples, a UE may be configured to use power control parameters (e.g., $P_O$, $\alpha$, and a closed loop index) associated with a scheduled BWP and CC.

In some examples, a UE may be configured to select either a power control parameter (e.g., PL RS) associated with a BWP and CC or a power control parameter (e.g., PL RS) associated with a received synchronization signal block (SSB). In some examples, if a PL RS is configured for the first TCI state on the reference BWP and CC, the UE may be configured (e.g., based on a dynamic indicator, a rule, or a pre-configuration) to use a PL RS associated with the reference BWP and CC. In some examples, if the PL RS is configured for the first TCI state on the reference BWP and CC, the UE may be configured (e.g., based on a dynamic indicator, a rule, or a pre-configuration) to use a PL RS associated with a scheduled BWP and CC.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 milliseconds) for wireless transmissions, with each frame consisting of, for example, 10 subframes of 1 millisecond (ms) each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
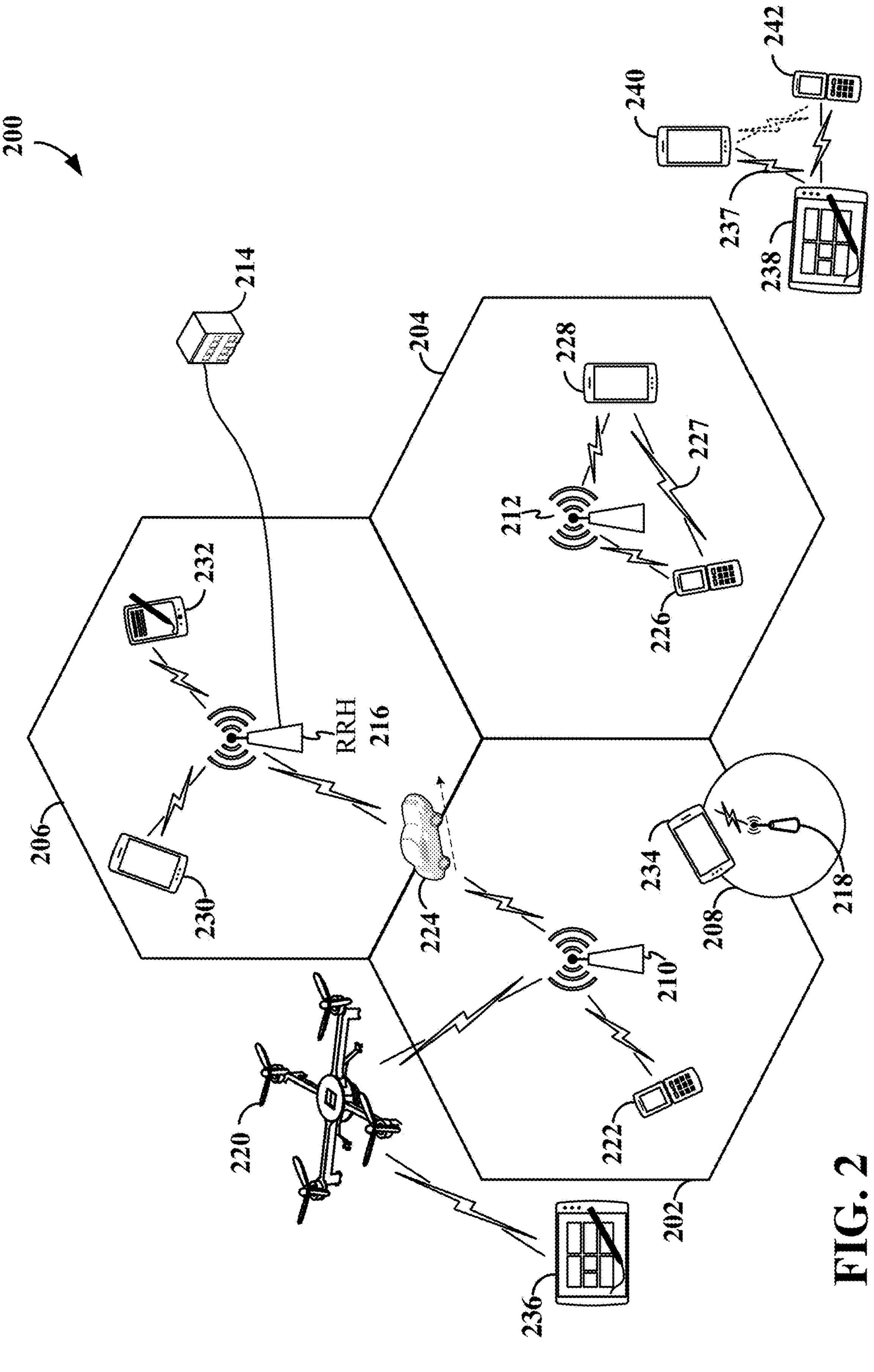
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and the UAV 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with a mobile base station, such as the UAV 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
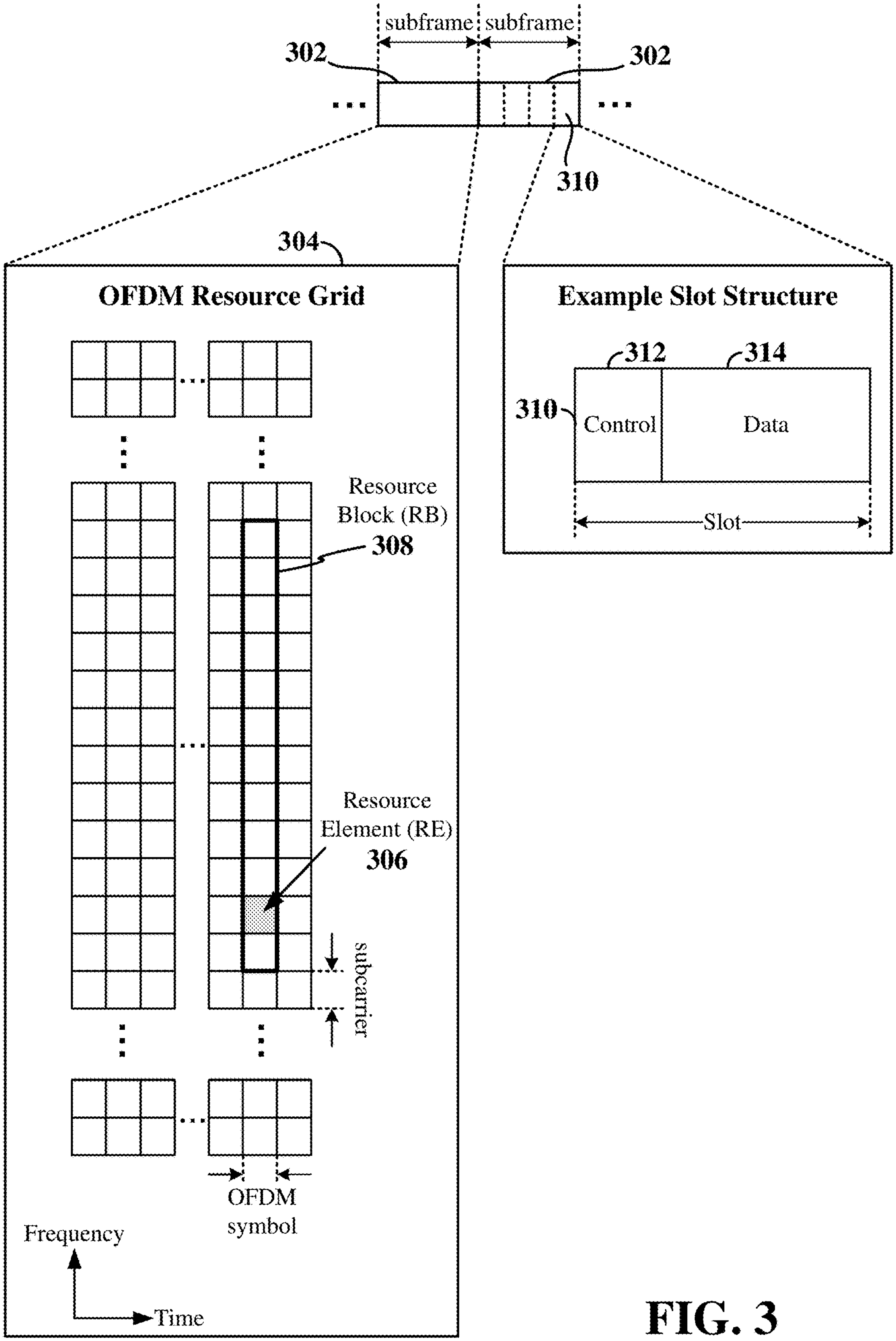
FIG. 3 is a schematic diagram illustrating organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., receive (Rx) V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

5G-NR networks may support carrier aggregation (CA) of component carriers (CCs) transmitted from different cells and/or different transmission and reception points (TRPs) in a multi-cell transmission environment. The different TRPs may be associated with a single serving cell or multiple serving cells. In some aspects, the term component carrier (CC) may refer to a carrier frequency (or band) utilized for communication within a cell.

Figure 4:
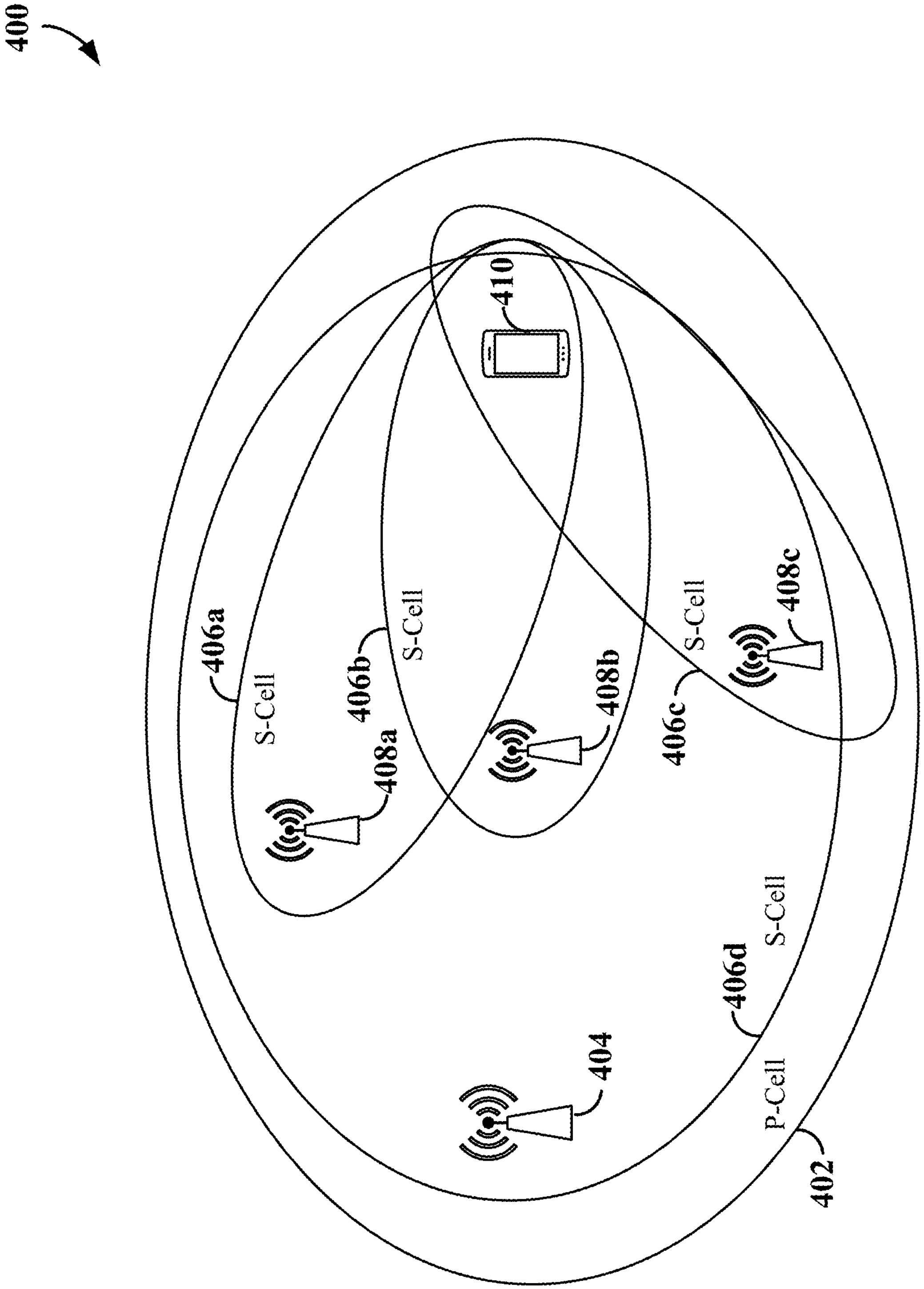
FIG. 4 is a conceptual illustration of a multi-cell transmission environment according to some aspects.

FIG. 4 is a diagram illustrating a multi-cell transmission environment 400 according to some aspects. The multi-cell transmission environment 400 includes a primary serving cell (PCell) 402 and one or more secondary serving cells (SCells) 406*a*, 406*b*, 406*c*, and 406*d*. The PCell 402 may be referred to as the anchor cell that provides a radio resource control (RRC) connection to a UE (e.g., a UE 410).

When carrier aggregation is configured in the multi-cell transmission environment 400, one or more of the SCells 406*a*-406*d* may be activated or added to the PCell 402 to form the serving cells serving the UE 410. In this case, each of the serving cells corresponds to a component carrier (CC). The CC of the PCell 402 may be referred to as a primary CC, and the CC of an SCell 406*a*-406*d* may be referred to as a secondary CC. In some examples, the UE 410 may correspond to any of the UEs or scheduled entities shown in any one or more of FIGS. 1, 2, 7, 8, 9, 10, 11, and 12.

Each of the PCell 402 and the SCells 406*a*-406*d* may be served by a transmission and reception point (TRP). For example, the PCell 402 may be served by a TRP 404 and each of the SCells 406*a*-406*c* may be served by a respective TRP 408*a*-408*c*. Each TRP 404 and 408*a*-408*c* may be a base station (e.g., gNB), remote radio head of a gNB, or other scheduling entity similar to those illustrated in any one or more of FIGS. 1, 2, 7, 8, 9, 10, and 11. In some examples, the PCell 402 and one or more of the SCells (e.g., the SCell 406*d*) may be co-located. For example, a TRP for the PCell 402 and a TRP for the SCell 406*d* may be installed at the same geographic location. Thus, in some examples, a TRP (e.g., the TRP 404) may include multiple TRPs, each corresponding to one of a plurality of co-located antenna arrays, and each supporting a different carrier (different CC). However, the coverage of the PCell 402 and the SCell 406*d* may differ since component carriers in different frequency bands may experience different path loss, and thus provide different coverage.

The PCell 402 is responsible not only for connection setup, but also for radio resource management (RRM) and radio link monitoring (RLM) of the connection with the UE 410. For example, the PCell 402 may activate one or more of the SCells (e.g., the SCell 406*a*) for multi-cell communication with the UE 410 to improve the reliability of the connection to the UE 410 and/or to increase the data rate. In some examples, the PCell may activate the SCell 406*a* on an as-needed basis (instead of maintaining the SCell activation when the SCell 406*a* is not utilized for data transmission/reception) to reduce power consumption by the UE 410.

In some examples, the PCell 402 may be a low band cell, and the SCells 406 may be high band cells. A low band cell uses a CC in a frequency band lower than that of the high band cells. For example, the high band cells may each use a respective mmWave CC (e.g., FR2 or higher), and the low band cell may use a CC in a lower frequency band (e.g., sub-6 GHz band or FR1). In general, a cell using an FR2 or higher CC can provide greater bandwidth than a cell using an FR1 CC. In addition, when using above-6 GHz frequency (e.g., mmWave) carriers, beamforming may be used to transmit and receive signals.

In some examples, the PCell 402 may utilize a first radio access technology (RAT), such as LTE, while one or more of the SCells 406 may utilize a second RAT, such as 5G-NR. In these examples, the multi-cell transmission environment may be referred to as a Multi-RAT-Dual Connectivity (MR-DC) environment. One example of MR-DC is an Evolved-Universal Terrestrial Radio Access Network-New Radio Dual Connectivity (EN-DC) mode that enables a UE to simultaneously connect to an LTE base station and a NR base station to receive data packets from and send data packets to both the LTE base station and the NR base station.

A transmission over the channels described above may involve the use of one or more antenna ports. An antenna port is a logical entity used to map data streams to antennas. A given antenna port may drive transmissions from one or more antennas and/or resolve signal components received over one or more antennas. An antenna port may be associated with a reference signal (RS) which may allow a receiver to distinguish data streams associated with the different antenna ports in a received transmission.

Some antenna ports may be referred to as being quasi co-located, meaning that the spatial parameters of a transmission on one antenna port may be inferred from the spatial parameters of another transmission on a different antenna port. Generally speaking, two signals transmitted from the same antenna port should experience the same radio channel, whereas transmitting signals from two different antenna ports should experience different radio conditions. In some cases, transmitted signals from two different antenna ports experience radio channels having common properties. In such cases, the antenna ports are said to be in quasi-colocation (QCL). Two antenna ports may be considered quasi co-located if properties of the channel over which a symbol on one antenna port is conveyed can be inferred from the channel over which a symbol on the other antenna port is conveyed. In 5G NR, UE are equipped with channel estimation, frequency offset error estimation and synchronization procedures for processing QCL. For example, if UE knows that the radio channels corresponding to two different antenna ports is QCL in terms of Doppler shift, then the UE can determine the Doppler shift for one antenna port and then apply the result on both antenna ports for channel estimation. This avoids the UE having to calculate Doppler shift for both antenna ports separately. Accordingly, a receiving device (e.g., a UE) may be able to perform channel estimation for demodulating data or control information received from a first set of antenna ports based on reference signals received from a second set of antenna ports that are quasi co-located with the first set of antenna ports. Thus, in some examples, a quasi co-location (QCL) relationship between antenna ports may improve the chances that a UE may successfully decode a downlink transmission from a base station. In some cases, a base station may transmit, to a UE, an indication of which antenna ports are quasi co-located such that the UE may be able to identify additional reference signals to use for channel estimation.

Four types of QCL are defined in 5G NR: QCL-TypeA; QCL-TypeB; QCL-TypeC; and QCL-TypeD. For example, QCL-TypeA may indicate a downlink reference signal (e.g., SSB or CSI-RS) or uplink reference signal (e.g., SRS) from which the large-scale channel properties (LSCPs), such as Doppler shift, Doppler spread, average delay, and/or delay spread, of a downlink channel or signal or uplink channel or signal may be inferred. QCL-TypeB and QCL-TypeC may also indicate reference signals (e.g., SSB, CSI-RS, or SRS) from which specific LSPCPs (e.g., Doppler shift and/or Doppler spread for QCL-TypeB and average delay and/or delay spread for QCL-TypeC) may be inferred. QCL-TypeD may indicate a spatial RX parameter (e.g., spatial property of the beam on which a downlink/uplink channel or signal is transmitted). The spatial property of the beam may be inferred from the beam utilized for transmission of a reference signal (e.g., SSB, CSI-RS, or SRS) and may indicate, for example, at least one of a beam direction or a beam width.

QCL information may be conveyed via transmission configuration indicator (TCI) states. A TCI state includes or maps to QCL relationship configurations between one or more reference signals (e.g., SSB, CSI-RS, and SRS) and downlink (DL) or uplink (UL) transmissions. For example, a TCI state may include a DL TCI for a downlink transmission, a joint DL/UL TCI, or spatial relation information for an UL transmission. A TCI state can include one or more reference signal IDs, each identifying an SSB resource, a CSI-RS resource, or an SRS resource. Each resource (SSB, CSI-RS, or SRS resource) indicates the particular beam, frequency resource, and OFDM symbol on which the corresponding reference signal is communicated. Thus, in examples in which the TCI state indicates QCL-TypeD for a downlink or uplink transmission, the reference signal ID may be utilized to identify the beam to be used for the downlink or uplink transmission based on the QCL relationship with an associated reference signal (e.g., SSB, CSI-RS, or SRS) indicated in the TCI state.

In some aspects, a base station may configure a set of transmission configuration indication (TCI) states to indicate to a UE one or more QCL relationships between antenna ports used for transmitting downlink (DL) signals to the UE, and/or one or more spatial transmit filter information for transmitting uplink (UL) signals from the UE. Each TCI state may be associated with a set of reference signals (e.g., synchronization signal blocks (SSBs) or different types of channel state information reference signals (CSI-RSs)), and the TCI state may indicate a QCL relationship between antenna ports used to transmit the set of reference signals and antenna ports used to transmit data or control information to a UE. As such, when a UE receives an indication of a particular TCI state from a base station, the UE may determine that the antenna ports used to transmit the reference signals associated with the TCI state are quasi co-located with antenna ports used to transmit data and control information to the UE.

As mentioned above, TCI states may be used for scheduling uplink (UL) transmissions as well. For example, a base station may configure a UE with a set of TCI states (e.g., via a radio resource control (RRC) message). The base station may then specify a particular TCI state to be used for an uplink transmission (e.g., via a DCI). Various information may be specified by a given UL TCI state. For example, an uplink TCI state may specify parameters for configuring a spatial transmit filter between RSs. In some aspects, a QCL may specify a BWP identifier, a reference signal identifier, and a QCL type.

A base station and a UE may support several TCI states. A set of TCI states may be referred to as a TCI state pool or a TCI state list. In some aspects, a given TCI state may specify parameters for configuring a quasi co-location (QCL) relationship (e.g., a common beam) or a spatial transmit filter between certain uplink/downlink channels/RSs. For example, the UE may use the parameters specified by a given TCI state (e.g., associated with a known good beam) to configure a beam for a transmission. In some examples, each TCI state configuration of a TCI state pool may specify or be associated with power control parameters to be used for a transmission that is based on the corresponding TCI state.

Figure 5:
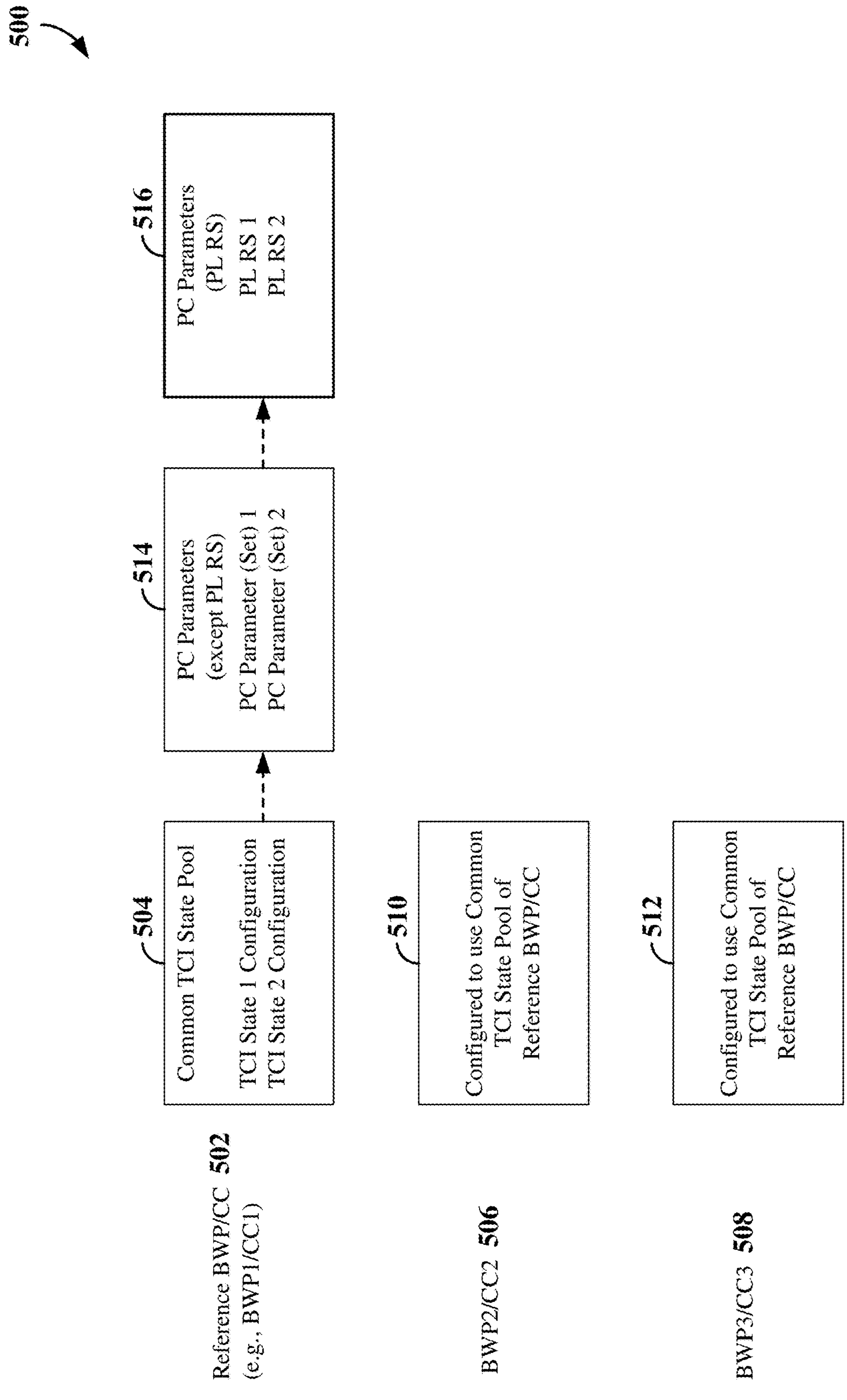
FIG. 5 is a diagram illustrating an example of a common transmission configuration indicator (TCI) state pool according to some aspects.

To reduce signaling overhead, a base station may configure a common TCI state pool for multiple BWPs and CCs. For example, as shown in the diagram 500 of FIG. 5, a base station may designate a particular BWP and CC (e.g., BWP1/CC1) as a reference BWP/CC 502 and configure the reference BWP/CC 502 with a common TCI state pool 504. The common TCI state pool 504 includes TCI state configuration information for various TCI states (e.g., TCI state 1 configuration and TCI state 2 configuration as shown in FIG. 5). Here, the term common TCI state pool indicates that the TCI state pool is shared across multiple BWPs and CCs. For example, the base station may configure other BWPs and CCs (e.g., a BWP2/CC2 506 and a BWP3/CC3 508 shown in FIG. 5) to use the common TCI state pool 504 specified for the reference BWP/CC 502. Thus, a configuration 510 of the BWP2/CC2 506 indicates that the common TCI state pool 504 is to be used for transmissions on the BWP2/CC2 506 and a configuration 512 of the BWP3/CC3

508 indicates that the common TCI state pool 504 is to be used for transmissions on the BWP3/CC3 508. This sharing of a common TCI state pool may reduce the amount of signaling overhead that would otherwise be used if the base station instead signaled the TCI state pool to be used by the reference BWP/CC 502, and signaled the TCI state pool to be used by the BWP2/CC2 506, and signaled the TCI state pool to be used by the BWP3/CC3 508, and so on.

Unified TCI states may be used in conjunction with such a common TCI state pool. For example, a Type 1 unified TCI state provides a joint DL/UL common TCI state to indicate a common beam for at least one DL channel/RS plus at least one UL channel/RS. As another example, a Type 3 unified TCI state provides a separate UL common TCI state to indicate a common beam for more than one UL channel/RS.

For a common TCI state ID update and activation procedure to provide common QCL information at least for a UE-dedicated PDCCH/PDSCH and/or common UL transmit (TX_spatial filter(s) at least for a UE-dedicated PUSCH/PUCCH across a set of BWPs/CCs (e.g., configured BWPs and CCs), the RRC-configured TCI state pool(s) can be configured in the PDSCH configuration (PDSCH-Config) for each BWP/CC. This RRC-configured TCI state pool configuration does not imply, however, that the use of a separate DL/UL TCI state pool is excluded or supported.

An RRC-configured TCI state pool can be omitted from the PDSCH configuration (PDSCH-Config) for each BWP/CC, and replaced with a reference to RRC-configured TCI state pool(s) in a reference BWP/CC. Here, it may be specified that in the PDSCH configuration (PDSCH-Config) of the reference BWP/CC, the RRC-configured TCI state pool(s) are to be configured. For a BWP/CC where the PDSCH configuration contains a reference to the RRC-configured TCI state pool(s) in a reference BWP/CC, the UE applies the RRC-configured TCI state pool(s) in the reference BWP/CC.

In some examples, the BWP/CC ID (cell) for QCL source RS (e.g., for QCL Type A, B, C, or D) in a QCL-Info of the TCI state may be omitted. In this case, the UE may assume that the QCL source RS is in the BWP/CC to which the TCI state applies.

The disclosure relates in some aspects to techniques for a user equipment (UE) to identify power control parameters to be used for a transmission on a bandwidth part (BWP) and component carrier (CC). In some examples, the power control parameters may include any of a $P_O$ parameter (e.g., a target signal-to-interference-and-noise ratio parameter), an $\alpha$ parameter (e.g., a path loss compensation factor), an l parameter (e.g., a closed loop index), and a path loss reference signal (PL RS) parameter for an uplink power control algorithm. In some examples, a PL RS may correspond to a periodic CSI-RS.

In one example of an uplink power control algorithm, if a UE transmits a PUSCH on active UL BWP b of carrier f of serving cell c using a parameter set configuration with index j and PUSCH power control adjustment state with index l, the UE determines the PUSCH transmission power $P_{PUSCH,b,f,c}(i,j,q_d,l)$ in PUSCH transmission occasion i as set forth in Equation 1:

$$P_{PUSCH,b,f,c}(i,j,q_d,l) = \min\begin{Bmatrix} P_{CMAX,f,c}(i) \\ P_{O,PUSCH,g,f,c}(j) + 10\log_{10}\left(2^{\mu}\cdot M_{RB,b,f,c}^{PUSCH}(i)\right) + \\ \alpha_{b,f,c}(j)\cdot PL_{b,f,c}(q_d) + \Delta_{TF,b,f,c}(i) + f_{b,f,c}(i,l) \end{Bmatrix}[dBm] \quad \text{EQUATION 1}$$

Here, $$f_{b,f,c}(i,l) = f_{b,f,c}(i-i_0) + \sum_{m=0}^{C(D_i)-1}\delta_{PUSCH,b,f,c}(m,l)$$

is the PUSCH power control adjustment state l for active UL BWP b of carrier f of serving cell C and PUSCH transmission occasion i if the UE is not provided tpc-Accumulation.

The parameter $$\sum_{m=0}^{C(D_i)-1}\delta_{PUSCH,b,f,c}(m,l)$$

is a sum of transmit power control (TPC) command values in a set $D_i$ of TPC command values with cardinality $C(D_i)$ that the UE receives between $K_{PUSCH}(i-i_0)-1$ symbols before PUSCH transmission occasion $I-i_0$ and $K_{PUSCH}(i)$ symbols before PUSCH transmission i on active UL BWP b of carrier f of serving cell C for PUSCH power control adjustment state l, where $i_0>0$ is the smallest integer for which $K_{PUSCH}(I-i_0)$ symbols before PUSCH transmission occasion $I-i_0$ is earlier than $K_{PUSCH}(i)$ symbols before PUSCH transmission occasion i.

In some aspects, the parameter $P_O$ of Equation 1 corresponds to a target signal-to-interference-and-noise ratio associated with a channel scheduled for an uplink transmission. In some aspects, the parameter a (alpha) is a path loss compensation factor. For example, if $\alpha=1$, the UE may fully compensate for the path loss (PL) of Equation 1. In contrast, if $\alpha<1$, the UE may partially compensate for the PL. The parameter l is a closed loop index (e.g., which may be specific to a UE).

A base station may configure a UE with the power control parameters (e.g., any of $P_O$, $\alpha$ (alpha), and l from Equation 1) to be used for uplink power control. In some examples, these and other power control parameters (e.g., a path loss reference signal (PL RS) parameter) may be associated with a particular TCI state. For example, the common TCI state pool 504 of FIG. 5 may be associated with power control (PC) parameters (except for PL RS) 514 and PC parameters (including PL RS) 516. Here, each TCI state may be associated one or more of the PC parameters. For example, TCI state 1 may be associated with (e.g., mapped to) PC parameter number 1 (or PC parameter set number 1) and PL RS number 1 and TCI state 2 may be associated with PC parameter number 2 (or PC parameter set number 2) and PL RS number 2. As another example, the configuration for TCI state 1 may include the PC parameters of PC parameter set number 1 and PL RS number 1 and the configuration for TCI state 2 may include the PC parameters of PC parameter set number 2 and PL RS number 2. Other mappings may be used in other examples.

Various examples may be used for indicating uplink power control (UL PC) parameters (e.g., $P_O$, alpha, closed loop index) other than PL-RS for a common TCI state pool scenario, for each of PUSCH, PUCCH, and SRS. In a first example, the $P_O$, alpha, and closed loop index parameters are associated with an UL TCI state or, if applicable, a common (joint) TCI state. For example, TCI state ID 1 may be mapped to PC parameter set 1, TCI state ID 2 may be mapped to PC parameter set 2, and so on. In a second example, the $P_O$, alpha, and closed loop index parameters are included in an UL TCI state or a common TCI state. For example, the TCI state configuration for TCI state ID 1 may include PC parameter set 1, the TCI state configuration for TCI state ID 2 may include PC parameter set 2, and so on. In a third example, the $P_O$, alpha, and closed loop index parameters are neither associated with nor included in an UL TCI state or a common TCI state. For example, a given PC parameter set may be associated with multiple TCI states. In some examples, the setting of $P_O$, alpha, and the closed loop index is associated with an UL channel or an UL RS. As such the setting may be channel-specific and/or signal-specific.

Various examples may be used to indicate a PL RS power control parameter. In a first example, PL RS may be included in an UL TCI state or, if applicable, a common (joint) TCI state. If PL RS is not included in a TCI state in this case, PL RS may be the periodic DL RS used as a source RS for determining a spatial transmit (TX) filter or the PL RS used for the UL RS in an UL TCI state or a common TCI state. In a second example, PL RS may be associated with (but not included in) an UL TCI state or a common TCI state. If PL RS is not included in a TCI state in this case, PL RS may be the periodic DL RS used as a source RS for determining a spatial transmit (TX) filter or the PL RS used for the UL RS in an UL TCI state or a common TCI state. In a third example, a UE calculates the path loss based on a periodic DL RS configured as the source RS for determining a spatial TX filter in an UL TCI state or a common TCI state. If a PL RS is not included in or associated with the UL TCI state of the common TCI state, the UE may be able to estimate the path loss based on the PL RS of an UL RS provided in an UL TCI state as a source RS for determining the spatial TX filter.

When the base station schedules a transmission by the UE on a given BWP and CC, the base station may indicate (e.g., via a TCI state identifier (ID)) which TCI state of the corresponding TCI state pool is to be used for the transmission. However, for a BWP and CC that share a common TCI state pool with other BWPs and CCs, power control parameters are only specified by or associated with the common TCI state pool for the reference BWP and CC. In other words, when using a common TCI framework, a TCI ID is shared by multiple BWPs/CCs, while the power control parameters may be associated with the TCIs in some examples. In this case, it is not specified how to obtain power control parameters associated with a common TCI.

The disclosure relates in some aspects to identifying power control parameters to be used for a particular BWP and CC when a common TCI state pool is configured for that BWP and CC. Here, since TCI state pools (that specify power control parameters) are not configured for the non-reference BWPs and CCs that share the common TCI state pool, the identification of the power control parameters for the particular BWP and CC may be based in some examples on the power control parameters associated with the common TCI state pool.

Figure 6:
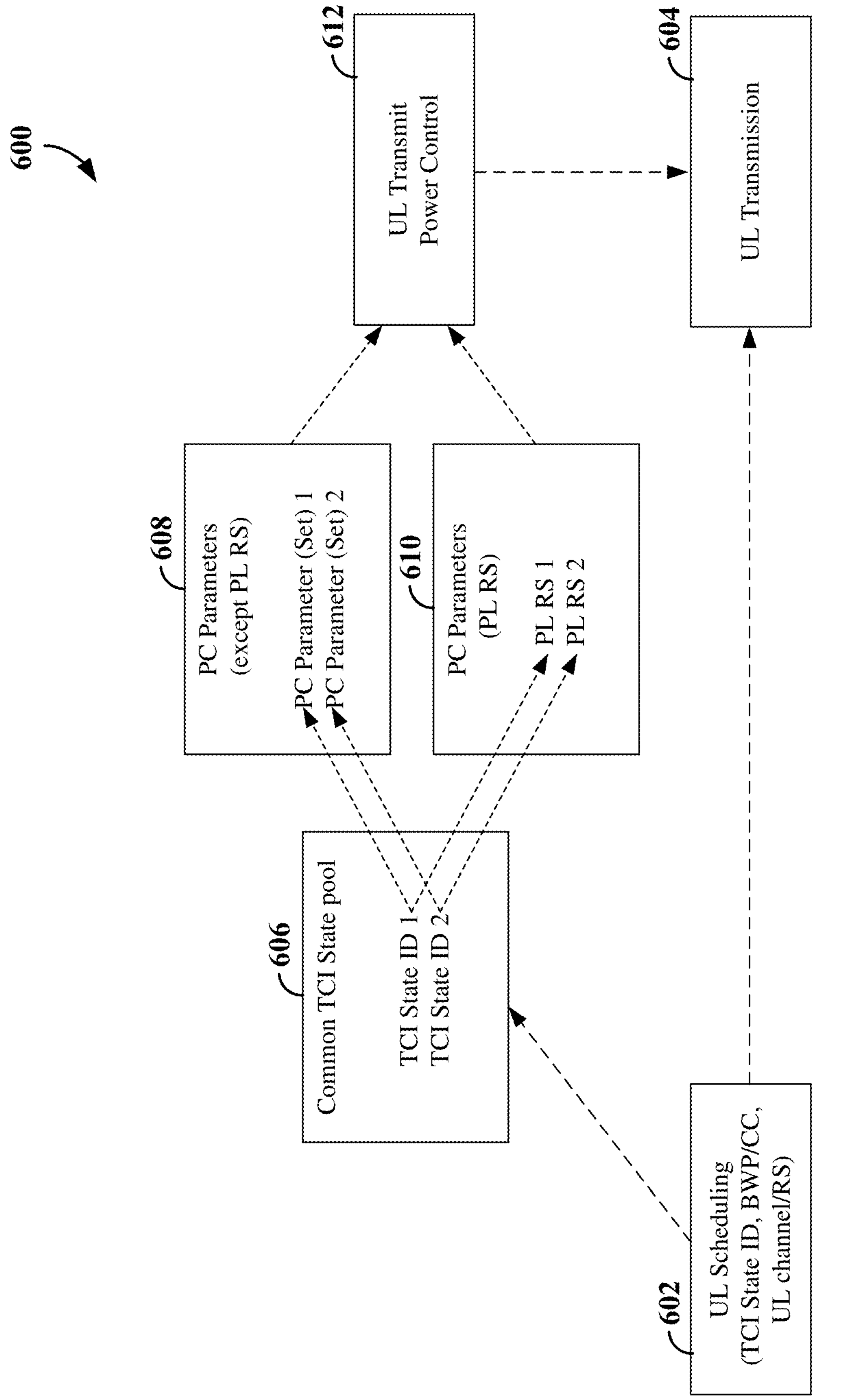
FIG. 6 is a diagram illustrating an example of a mapping of a transmission configuration indicator state identifier to power control parameters according to some aspects.

As shown in the diagram 600 of FIG. 6, a base station (not shown in FIG. 6) sends uplink (UL) scheduling 602 (e.g., a DCI, a MAC-CE, etc.) to a UE (not shown in FIG. 6) to schedule an UL transmission 604 by the UE. The UL scheduling 602 includes indications of a TCI state ID to be used for the UL transmission 604, the UL channel/RS for the UL transmission 604, and the target (e.g., scheduled) BWP and CC on which the UL transmission 604 is to be transmitted. In a scenario where the target BWP and CC shares a common reference pool 660 that is configured for a reference BWP and CC (e.g., as discussed herein), the UE can use the TCI state ID indicated by the UL scheduling 602 to determine the power control (PC) parameters to be used for the UL transmission 604. For example, for the common TCI state pool 606, TCI state ID 1 may map to PC parameter 1 (or PC parameter set 1) of the PC parameters 608 and PL RS 1 of the PC parameters 610, while TCI state ID 2 may map to PC parameter 2 (or PC parameter set 2) of the PC parameters 608 and PL RS 2 of the PC parameters 610. Thus, if the TCI state indicated in the UL scheduling 602 is TCI state 1, UL transmit power control 612 of the UE may use PC parameters corresponding to PC parameter 1 and PL RS 1 to calculate the transmit power for the transmission 604.

In some examples, the UE may be configured to use the power control parameters (e.g., $P_O$, $\alpha$, and a closed loop index) associated with the reference BWP and CC (e.g., the reference BWP/CC 502 of FIG. 5). For example, upon receiving UL scheduling information (e.g., the UL scheduling 602) specifying a first TCI state ID (e.g., TCI state ID 1) for an uplink transmission in a non-reference BWP and CC, the UE may identify the power control parameters indicated by the first TCI state ID and the common TCI state pool 606 for the reference BWP and CC. The UE may then use these identified power control parameters for a transmission on the scheduled non-reference BWP and CC.

In some examples, a UE may be configured to use power control parameters (e.g., $P_O$, $\alpha$, and a closed loop index) associated with a scheduled BWP and CC (e.g., the BWP2/CC2 506 of FIG. 5). Here, a UE may be configured with power control parameters for each BWP and CC which shares the common TCI state pool on the reference BWP and CC (e.g., the reference BWP/CC 502 of FIG. 5). For example, the BWP2/CC2 506 may be configured with a set of power control parameters. Upon receiving UL scheduling information (e.g., the UL scheduling 602) specifying a first TCI state ID (e.g., TCI state ID 1) and the scheduled BWP and CC, the UE may identify a power control parameter number (e.g., PC parameter 1, 2, etc.) or a power control set parameter number (e.g., PC parameter set 1, 2, etc.) indicated by or associated with the first TCI state ID and the common TCI state pool 504 for the reference BWP and CC. The UE may then determine the power control parameters specified for that identified power control parameter number or power control parameter set number on the scheduled BWP and CC. That is, the UE uses the common TCI state pool 606 to determine the PC parameter number (or PC parameter set number) associated with a particular TCI state ID (where this determination is based on the mapping for the reference BWP and CC). Once the UE determines this PC parameter number (or PC parameter set number), the UE identifies the PC parameters associated with this PC parameter number (or PC parameter set number) on the scheduled BWP and CC (e.g., based on the configuration of the scheduled BWP and CC as discussed above). The UE may then use these identified power control parameters for a transmission on the scheduled BWP and CC.

In some examples, a UE may be configured to select either a power control parameter (e.g., PL RS) associated with a BWP and CC or a power control parameter (e.g., PL RS) associated with a received synchronization signal block (SSB). For example, upon receiving scheduling information specifying a first TCI state ID, the UE may determine whether a PL RS is configured for the first TCI state ID on the reference BWP and CC. If the PL RS is configured to be associated with or included in the first TCI state on the reference BWP and CC, the UE may use a PL RS associated with a BWP (e.g., the reference BWP and CC or a scheduled BWP and CC) for a transmission on the scheduled BWP and CC. Conversely, if the PL RS is not configured to be associated with or included in the first TCI state on the reference BWP and CC, the UE may use a PL RS associated with an SSB for a transmission on the scheduled BWP and CC.

In some examples, if the PL RS is configured to be associated with or included in the first TCI state on the reference BWP and CC, the UE may be configured (e.g., based on a dynamic indicator, a rule, or a pre-configuration) to use a PL RS associated with the reference BWP and CC. For example, upon receiving scheduling information specifying a first TCI state ID, the UE may identify the PL RS indicated by the first TCI state ID and the common TCI state pool for the reference BWP and CC. The UE may then use this PL RS for a transmission on a scheduled BWP and CC.

In some examples, if the PL RS is configured to be associated with or included in the first TCI state on the reference BWP and CC, the UE may be configured (e.g., based on a dynamic indicator, a rule, or a pre-configuration) to use a PL RS associated with a scheduled BWP and CC. For example, upon receiving scheduling information specifying a first TCI state ID, the UE may identify the RS ID indicated by the first TCI state ID and the common TCI state pool for the reference BWP and CC. The UE may then determine the PL RS specified for that identified RS ID on the scheduled BWP and CC. The UE may then use the PL RS specified for the scheduled BWP and CC for a transmission on the scheduled BWP and CC.

Summarizing the above, for a common TCI state pool shared by multiple BWP/CCs, the PC parameters used for transmitting an uplink channel or RS on each target (e.g., scheduled) BWP/CC with a selected common TCI state ID can be determined as follows. For the PC parameters $P_O$, alpha, and closed loop index (e.g., the parameters other than PL RS), in a first example (Example 1A), the PC parameters configured on the reference BWP/CC associated with the selected common TCI state ID may be used for the uplink transmissions with the selected common TCI state ID scheduled on the target BWP/CC. The PC parameters may be configured in a PC parameter set, where a set may include any of a value of P0, a value of alpha, and a value of close loop index. In some examples, multiple PC parameter sets may be configured in a BWP/CC, where each has an different set ID and is associated with a common TCI state ID.

Figure 7:
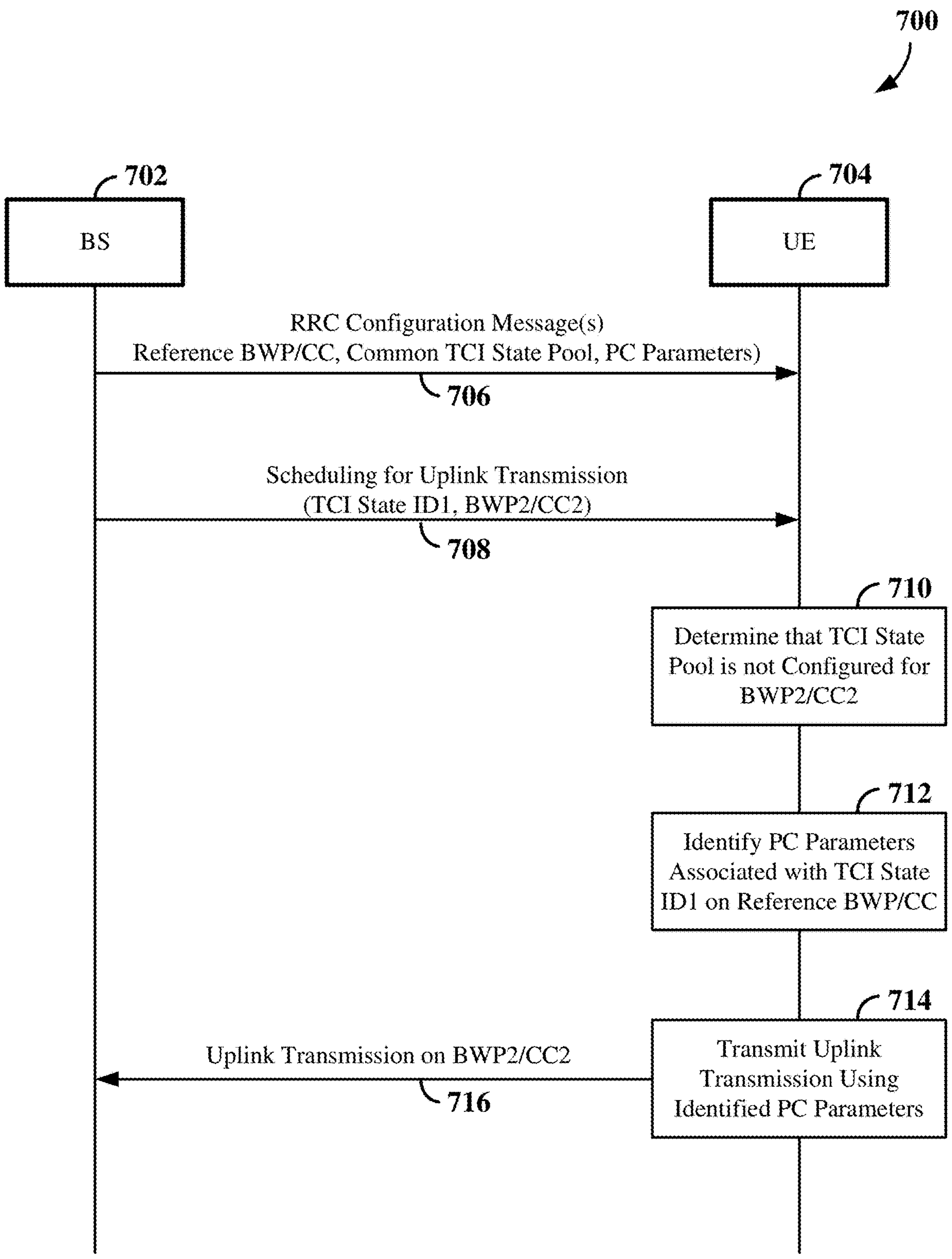
FIG. 7 is a signaling diagram illustrating a first example of identifying power control parameters for a transmission according to some aspects.

FIG. 7 is a diagram illustrating an example of signaling 700 associated with identifying power control parameters in a wireless communication network including a base station (BS) 702 and a user equipment (UE) 704. In some examples, the signaling 700 may correspond to Example 1A discussed above. In some examples, the BS 702 may correspond to any of the base stations or scheduling entities shown in any one or more of FIGS. 1, 2, 4, 8, 9, 10, and 11. In some examples, the UE 704 may correspond to any of the UEs or scheduled entities shown in any one or more of FIGS. 1, 2, 4, 8, 9, 10, 11, and 12.

At 706 of FIG. 7, the BS 702 sends one or more RRC configuration messages to the UE 704. For example, the BS 702 may configure a reference BWP/CC, and a common TCI state pool for the reference BWP/CC, including power control (PC) parameters (e.g., $P_O$, alpha, and closed loop index) as discussed herein.

At 708, the BS 702 schedules the UE 704 for an uplink transmission. In some examples, the BS 702 may transmit a DCI, a MAC-CE, or some other signaling that indicates the scheduled channel, the scheduled BWP/CC (e.g., BWP2/CC2), and a TCI state ID (e.g., TCI state ID1) for the transmission.

At 710, the UE 704 may determine that a TCI state pool is not configured for the scheduled BWP/CC (e.g., BWP2/CC2). For example, the UE 704 may determine based on configuration information received from the BS 702 that BWP2/CC2 shares a common TCI state pool with one or more other BWPs/CCs, including a reference BWP/CC (e.g., BWP1/CC1).

At 712, the UE 704 identifies the PC parameters that are associated with TCI state ID1 on the reference BWP/CC. As discussed above, in some examples, this may involve identifying the PC parameters that are mapped to the TCI state ID1 for the reference BWP/CC. In other examples, this may involve identifying the PC parameters that are included in the TCI state configuration corresponding to TCI state ID1 for the reference BWP/CC.

At 714, the UE 704 uses the PC parameters identified at 712 to transmit an uplink transmission 712 on the scheduled BWP/CC (e.g., BWP2/CC2). For example, the UE 704 may use the $P_O$, alpha, and closed loop index parameters in Equation 1 to calculate a transmit power for the transmission.

In a second example (Example 2A), the PC parameters configured on the target BWP/CC with the same PC parameter ID (or the same PC parameter set ID) as the PC parameter ID (or the same PC parameter set ID) associated with the selected common TCI state ID on the reference BWP/CC may be used for an uplink transmission with the selected common TCI state ID scheduled on the target BWP/CC.

Figure 8:
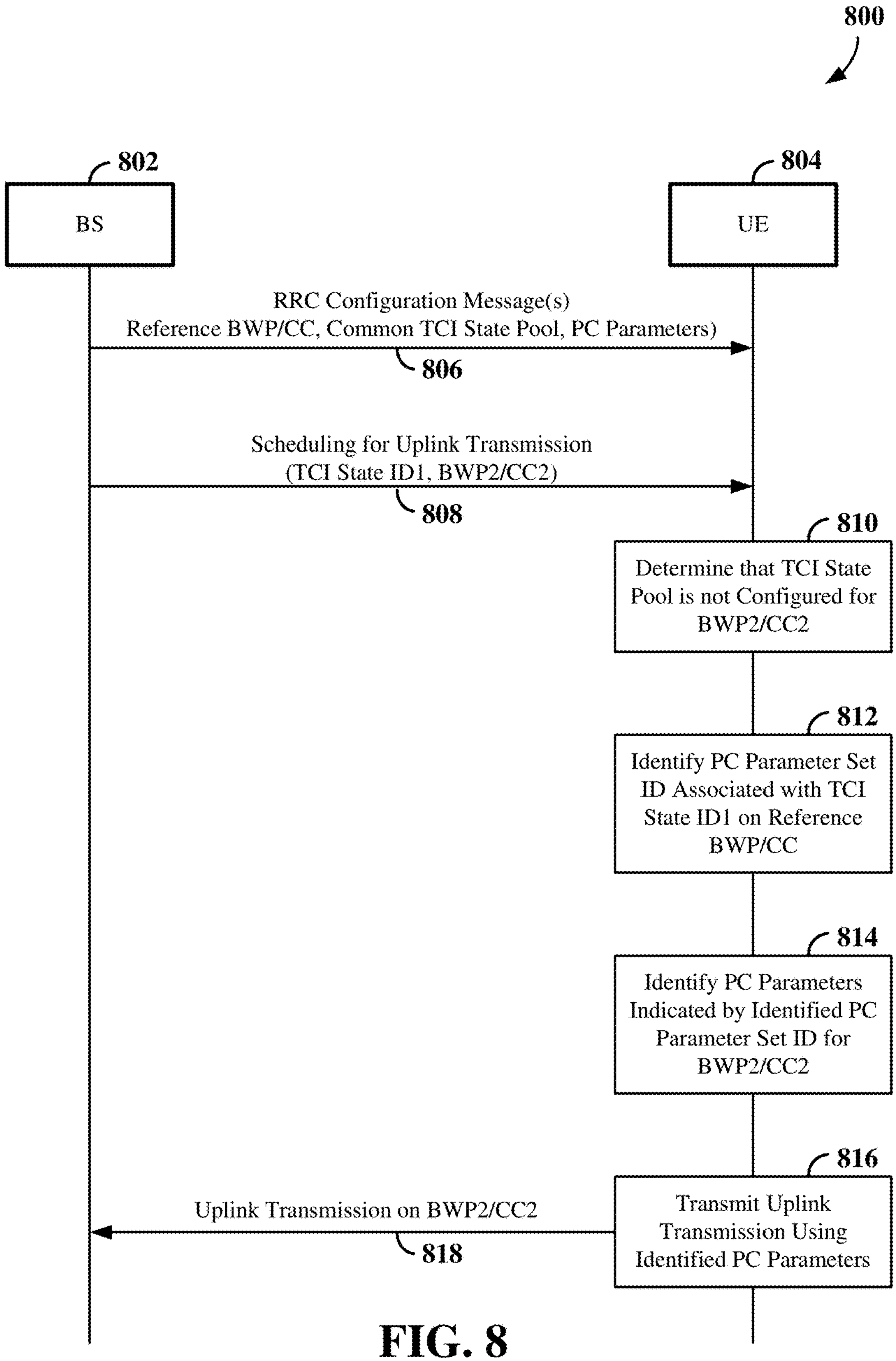
FIG. 8 is a signaling diagram illustrating a second example of identifying power control parameters for a transmission according to some aspects.

FIG. 8 is a diagram illustrating an example of signaling 800 associated with identifying power control parameters in a wireless communication network including a base station (BS) 802 and a user equipment (UE) 804. In some examples, the signaling 800 may correspond to Example 2A discussed above. In some examples, the BS 802 may correspond to any of the base stations or scheduling entities shown in any one or more of FIGS. 1, 2, 4, 7, 9, 10, and 11. In some examples, the UE 804 may correspond to any of the UEs or scheduled entities shown in any one or more of FIGS. 1, 2, 4, 7, 9, 10, 11, and 12.

At 806 of FIG. 8, the BS 802 sends one or more RRC configuration messages to the UE 804. For example, the BS 802 may configure a reference BWP/CC, and a common TCI state pool for the reference BWP/CC, including power control (PC) parameters (e.g., $P_O$, alpha, and closed loop index) as discussed herein.

At 808, the BS 802 schedules the UE 804 for an uplink transmission. In some examples, the BS 802 may transmit a DCI, a MAC-CE, or some other signaling that indicates the scheduled channel, the scheduled BWP/CC (e.g., BWP2/CC2), and a TCI state ID (e.g., TCI state ID1) for the transmission.

At 810, the UE 804 may determine that a TCI state pool is not configured for the scheduled BWP/CC (e.g., BWP2/CC2). For example, the UE 804 may determine based on configuration information received from the BS 802 that BWP2/CC2 shares a common TCI state pool with one or more other BWPs/CCs, including a reference BWP/CC (e.g., BWP1/CC1).

At 812, the UE 804 identifies the PC parameter set ID that is associated with TCI state ID1 on the reference BWP/CC. As discussed above, in some examples, this may involve identifying the PC parameter set ID that is mapped to the TCI state ID1 for the reference BWP/CC. In other examples, this may involve identifying the PC parameter set ID that is included in the TCI state configuration corresponding to TCI state ID1 for the reference BWP/CC.

At 814, the UE 804 identifies the PC parameters that are associated with the PC parameter set ID identified at 812 for the schedule BWP/CC. As discussed above, in some examples, this may involve identifying the PC parameters that are mapped to the PC parameter set ID for BWP2/CC2. In other examples, this may involve identifying the PC parameters that are included in a TCI state configuration corresponding to the PC parameter set ID for BWP2/CC2.

At 816, the UE 804 uses the PC parameters identified at 814 to transmit an uplink transmission 818 on the scheduled BWP/CC (e.g., BWP2/CC2). For example, the UE 804 may use the $P_O$, alpha, and closed loop index parameters in Equation 1 to calculate a transmit power for the transmission.

For the PL RS power control parameter, if the PL RS is associated with or included in the selected common TCI state ID on the reference BWP/CC, the PL RS configured on the target BWP/CC or the reference BWP/CC is used. Otherwise (e.g., if the PL RS is not associated with or included in the selected common TCI state ID on the reference BWP/CC), the SSB for the latest MIB reading may be used as the PL RS. This operation is described in FIG. 9.

Figure 9:
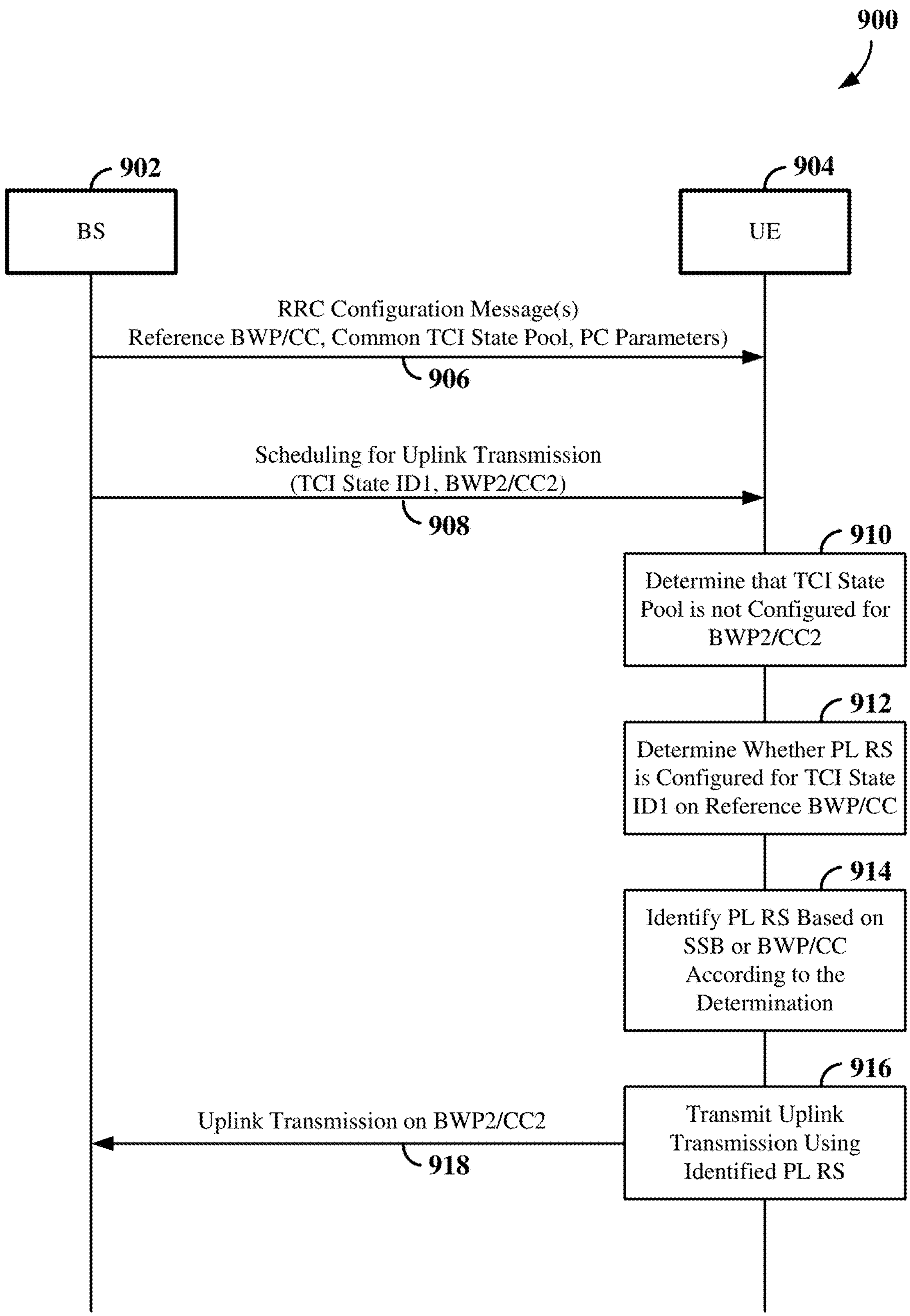
FIG. 9 is a signaling diagram illustrating a first example of identifying a path loss reference signal parameter for a transmission according to some aspects.

FIG. 9 is a diagram illustrating an example of signaling 900 associated with identifying power control parameters in a wireless communication network including a base station (BS) 902 and a user equipment (UE) 904. In some examples, the BS 902 may correspond to any of the base stations or scheduling entities shown in any one or more of FIGS. 1, 2, 4, 7, 8, 10, and 11. In some examples, the UE 904 may correspond to any of the UEs or scheduled entities shown in any one or more of FIGS. 1, 2, 4, 7, 8, 10, 11, and 12.

At 906 of FIG. 9, the BS 902 sends one or more RRC configuration messages to the UE 904. For example, the BS 902 may configure a reference BWP/CC, and a common TCI state pool for the reference BWP/CC, including power control (PC) parameters (e.g., $P_O$, alpha, and closed loop index) as discussed herein.

At 908, the BS 902 schedules the UE 904 for an uplink transmission. In some examples, the BS 902 may transmit a DCI, a MAC-CE, or some other signaling that indicates the scheduled channel, the scheduled BWP/CC (e.g., BWP2/CC2), and a TCI state ID (e.g., TCI state ID1) for the transmission.

At 910, the UE 904 may determine that a TCI state pool is not configured for the scheduled BWP/CC (e.g., BWP2/CC2). For example, the UE 904 may determine based on configuration information received from the BS 902 that BWP2/CC2 shares a common TCI state pool with one or more other BWPs/CCs, including a reference BWP/CC (e.g., BWP1/CC1).

At 912, the UE 904 determines whether a PL RS is configured for TCI state ID1 on the reference BWP/CC. As discussed above, in some examples, this may involve determining whether an RS ID is mapped to the TCI state ID1 for the reference BWP/CC. In other examples, this may involve determining whether an RS ID is included in the TCI state configuration corresponding to TCI state ID1 for the reference BWP/CC.

At 914, depending on the results of the determination of 912, the UE 904 identifies a PL RS based on an SSB or based on the scheduled BWP/CC or the reference BWP/CC. For example, if a PL RS is not configured for TCI state ID1 on the reference BWP/CC, the UE 904 may identify a PL RS based on an SSB as discussed above. Conversely, if a PL RS is configured for TCI state ID1 on the reference BWP/CC, the UE 904 may identify a PL RS based on the scheduled BWP/CC (e.g., as described in more detail below in conjunction with FIG. 10) or the reference BWP/CC (e.g., as described in more detail below in conjunction with FIG. 11).

At 916, the UE 904 uses the PL RS identified at 914 to transmit an uplink transmission 918 on the scheduled BWP/CC (e.g., BWP2/CC2). For example, the UE 904 may use the PL RS for the PL parameter in Equation 1 to calculate a transmit power for the transmission.

If the PL RS is associated with or included in the selected common TCI state ID on the reference BWP/CC, various examples may be used to determine the PL RS power control parameter to be used for a transmission on a target (e.g., scheduled) BWP/CC. In a first example (Example 1B), the PL RS configured on the target BWP/CC with the same RS ID associated with or included in the selected common TCI state ID is used for an uplink transmission with the selected common TCI state ID scheduled on the target BWP/CC. In this case, the PL RS may be configured on the target BWP/CC.

Figure 10:
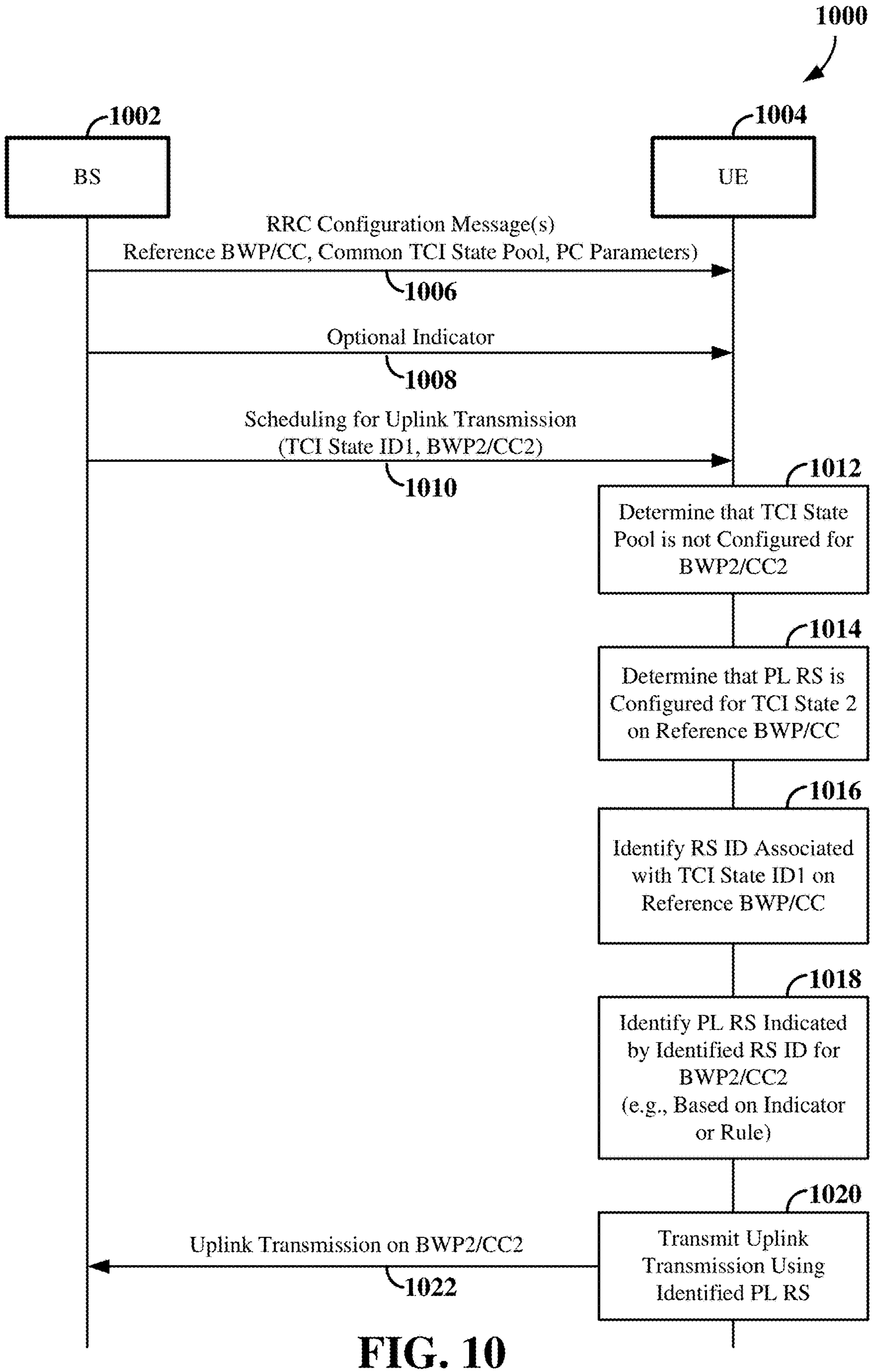
FIG. 10 is a signaling diagram illustrating a second example of identifying a path loss reference signal parameter for a transmission according to some aspects.

FIG. 10 is a diagram illustrating an example of signaling 1000 associated with identifying power control parameters in a wireless communication network including a base station (BS) 1002 and a user equipment (UE) 1004. In some examples, the signaling 1000 may correspond to Example 1B discussed above. In some examples, the BS 1002 may correspond to any of the base stations or scheduling entities shown in any one or more of FIGS. 1, 2, 4, 7, 8, 9, and 11. In some examples, the UE 1004 may correspond to any of the UEs or scheduled entities shown in any one or more of FIGS. 1, 2, 4, 7, 8, 9, 11, and 12.

At 1006 of FIG. 10, the BS 1002 sends one or more RRC configuration messages to the UE 1004. For example, the BS 1002 may configure a reference BWP/CC, and a common TCI state pool for the reference BWP/CC, including power control (PC) parameters (e.g., $P_O$, alpha, and closed loop index) as discussed herein.

At optional 1008, the BS 1002 may transmit an indicator to the UE 1004 that specifies whether the UE 1004 is to identify a PL RS based on a PL RS configured on a reference BWP/CC or based on a PL RS configured on a scheduled BWP/CC. For example, as discussed above a value of zero (0) for the indicator may specify that the UE 1004 is to use Example 1B, while a value of one (1) for the indicator may specify that the UE 1004 is to use Example 2B (as described in FIG. 11).

At 1010, the BS 1002 schedules the UE 1004 for an uplink transmission. In some examples, the BS 1002 may transmit a DCI, a MAC-CE, or some other signaling that indicates the scheduled channel, the scheduled BWP/CC (e.g., BWP2/CC2), and a TCI state ID (e.g., TCI state ID1) for the transmission.

At 1012, the UE 1004 may determine that a TCI state pool is not configured for the scheduled BWP/CC (e.g., BWP2/CC2). For example, the UE 1004 may determine based on configuration information received from the BS 1002 that BWP2/CC2 shares a common TCI state pool with one or more other BWPs/CCs, including a reference BWP/CC (e.g., BWP1/CC1).

At 1014, the UE 1004 determines that a PL RS is configured for TCI state ID1 on the reference BWP/CC. As discussed above, in some examples, this may involve determining that an RS ID is mapped to the TCI state ID1 for the reference BWP/CC. In other examples, this may involve determining that an RS ID is included in the TCI state configuration corresponding to TCI state ID1 for the reference BWP/CC. At 1016, as a result of the determination of 1014, the UE 1004 identifies the RS ID associated with TCI state ID 1 on the reference BWP/CC.

At 1018, the UE 1004 identifies the PL RS indicated by the RS ID (from 1016) for the scheduled BWP/CC. As discussed above, in some examples, a decision to identify the PL RS based on the scheduled BWP/CC may be made based on the indicator received at 1008. In other examples, a decision to identify the PL RS based on the scheduled BWP/CC may be made based on a rule. For example, if there is a PL RS configured on the scheduled BWP/CC that has the same RS ID as the RS ID identified at 1016 (for the reference BWP/CC), then the PL RS configured on the scheduled BWP/CC may be used. The alternative condition for this rule is described below in conjunction with FIG. 11.

At 1020, the UE 1004 uses the PL RS identified at 1018 to transmit an uplink transmission 1022 on the scheduled BWP/CC (e.g., BWP2/CC2). For example, the UE 1004 may use the PL RS for the PL parameter in Equation 1 to calculate a transmit power for the transmission.

In a second example (Example 2B), the PL RS configured on the reference BWP/CC with the same RS ID associated with or included in the selected common TCI state ID is used for an uplink transmission with the selected common TCI state ID scheduled on the target BWP/CC.

Figure 11:
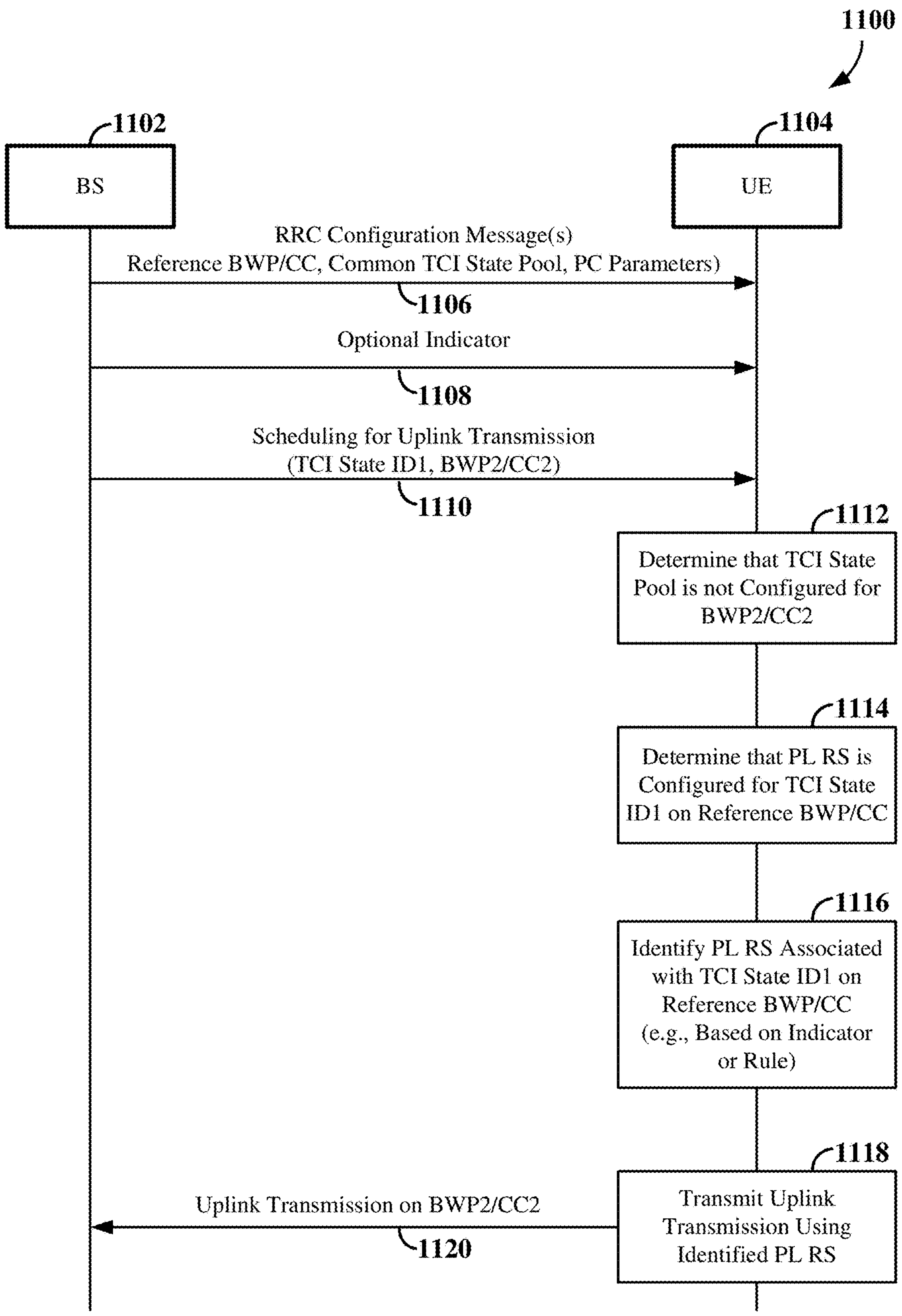
FIG. 11 is a signaling diagram illustrating a third example of identifying a path loss reference signal parameter for a transmission according to some aspects.

FIG. 11 is a diagram illustrating an example of signaling 1100 associated with identifying power control parameters in a wireless communication network including a base station (BS) 1102 and a user equipment (UE) 1104. In some examples, the signaling 1100 may correspond to Example 2B discussed above. In some examples, the BS 1102 may correspond to any of the base stations or scheduling entities shown in any one or more of FIGS. 1, 2, 4, 7, 8, 9, and 10. In some examples, the UE 1104 may correspond to any of the UEs or scheduled entities shown in any one or more of FIGS. 1, 2, 4, 7, 8, 9, 10, and 12.

At 1106 of FIG. 11, the BS 1102 sends one or more RRC configuration messages to the UE 1104. For example, the BS 1102 may configure a reference BWP/CC, and a common TCI state pool for the reference BWP/CC, including power control (PC) parameters (e.g., $P_O$, alpha, and closed loop index) as discussed herein.

At optional 1108, the BS 1102 may transmit an indicator to the UE 1104 that specifies whether the UE 1104 is to identify a PL RS based on a PL RS configured on a reference BWP/CC or based on a PL RS configured on a scheduled BWP/CC. For example, as discussed above a value of one (1) for the indicator may specify that the UE 1104 is to use Example 2B.

At 1110, the BS 1102 schedules the UE 1104 for an uplink transmission. In some examples, the BS 1102 may transmit a DCI, a MAC-CE, or some other signaling that indicates the scheduled channel, the scheduled BWP/CC (e.g., BWP2/CC2), and a TCI state ID (e.g., TCI state ID1) for the transmission.

At 1112, the UE 1104 may determine that a TCI state pool is not configured for the scheduled BWP/CC (e.g., BWP2/CC2). For example, the UE 1104 may determine based on configuration information received from the BS 1102 that BWP2/CC2 shares a common TCI state pool with one or more other BWPs/CCs, including a reference BWP/CC (e.g., BWP1/CC1).

At 1114, the UE 1104 determines that a PL RS is configured for TCI state ID1 on the reference BWP/CC. As discussed above, in some examples, this may involve determining that an RS ID is mapped to the TCI state ID1 for the reference BWP/CC. In other examples, this may involve determining that an RS ID is included in the TCI state configuration corresponding to TCI state ID1 for the reference BWP/CC.

At 1116, as a result of the determination of 1114, the UE 1104 identifies the RS ID associated with TCI state ID 1 on the reference BWP/CC. As discussed above, in some examples, a decision to identify the PL RS based on the reference BWP/CC may be made based on the indicator received at 1108. In other examples, a decision to identify the PL RS based on the reference BWP/CC may be made based on a rule. For example, if there is no PL RS configured on the scheduled BWP/CC that has the same RS ID as the RS ID identified at 1116 (for the reference BWP/CC), then the PL RS configured on the reference BWP/CC may be used.

At 1118, the UE 1104 uses the PL RS identified at 1116 to transmit an uplink transmission 1120 on the scheduled BWP/CC (e.g., BWP2/CC2). For example, the UE 1104 may use the PL RS for the PL parameter in Equation 1 to calculate a transmit power for the transmission.

In a third example (Example 3B), an indicator may be used to indicate whether the PL RS for an uplink transmission on the target BWP/CC should use the PL RS configured for the target BWP/CC or the PL RS configured for the reference BWP/CC. For example, if the indicator is zero (0), Example 1B may be used. Conversely, if the indicator is one (1), Example 2B may be used. In a fourth example (Example 4B), a rule is used to indicate whether the PL RS for an uplink transmission on the target BWP/CC should use the PL RS configured for the target BWP/CC or the PL RS configured for the reference BWP/CC. For example, if a PL RS with the same RS ID associated with or included in the selected common TCI state ID is configured on the target BWP/CC, then this PL RS may be used for an uplink transmission on the target BWP/CC. Otherwise (e.g., if a PL RS with the same RS ID associated with or included in the selected common TCI state ID is not configured on the target BWP/CC), the PL RS on the reference BWP/CC may be used for an uplink transmission on the target BWP/CC.

In some examples, the reference CC may be a special cell (SpCell) such as a primary cell (PCell), a primary secondary cell (PSCell),or a PUCCH secondary cell (PUCCH SCell). In this case, the indicator of Example 3B can be used for indicating that the PL RS is configured on an SpCell or a target Cell. For example, the RRC parameter "pathlossReferenceLinking" configured to the UE may indicate whether the UE shall apply the PL RS configured on the downlink of an SpCell (PCell for a master cell group (MCG) or PSCell for a secondary cell group (SCG)) or configured on the downlink of an SCell that corresponds with the scheduled uplink transmission. The RRC parameter "pathlossReferenceLinking" may be configured to be common among multiple BWP/CCs which shares a same TCI state pool.

Table 1 illustrates an example of how power control parameters may be determined for a BWP/CC that shares a common TCI state pool specified for a reference BWP/CC. As indicated, the common TCI state pool configured for the reference BWP/CC (BWP1/CC1) is defined with two TCI state IDs (TCI ID1 and TCI ID 2) in the pool. In addition, BWP2/CC2 and BWP3/CC3 are configured to use the common TCI state pool configured for the reference BWP/CC.

TABLE 1

| | TCI | PC parameter set (P0, alpha, CLI) Example 1A | PC parameter set (P0, alpha, CLI) Example 2A |
|---|---|---|---|
| BWP1/CC1 (reference BWP and CC) | TCI pool = {TCI ID1, TCI ID 2} | PC parameter set1, PC parameter set2 | PC parameter set1, PC parameter set2 |
| BWP2/CC2 | Reuse reference BWP and CC | Reuse reference BWP and CC | PC parameter set1, PC parameter set2 |
| BWP3/CC3 | Reuse reference BWP and CC | Reuse reference BWP and CC | PC parameter set1, PC parameter set2 |

As indicated, TCI state configurations of the common TCI state pool are associated with (e.g., include) certain PC parameter sets ($P_O$, alpha, and closed loop index). In some examples (e.g., in Example 1A), to determine the PC parameter set to use for BWP2/CC2 or BWP3/CC3, a UE may use the PC parameter sets configured for the reference BWP/CC. For example, the PC parameter set1 and PC parameter set2 are associated with TCI ID1 and TCI ID2 respectively, and configured on the reference BWP/CC. When a UE is scheduled with an uplink transmission on BWP2/CC2 or BWP3/CC3 and indicated with a TCI ID 1, the UE may apply the PC parameter set 1 configured on the BWP1/CC1 for the scheduled uplink transmission. In some other examples (e.g., in Example 2A), to determine the PC parameter set to use for BWP2/CC2 or BWP3/CC3, a UE may use the PC parameter sets configured for the target BWP/CC. For example, the PC parameter set 1 and PC parameter set 2 are configured on each target BWP/CC (BWP2/CC2 and BWP3/CC3), and associated with TCI ID1 and ID2 respectively. When a UE is scheduled with an uplink transmission on BWP2/CC2 and indicated with a TCI ID 1, the UE may apply the PC parameter set 1 configured on the BWP2/CC2 for the scheduled uplink transmission.

TABLE 2

| | TCI | PC parameters (PLRS) Example 2B | PC parameters (PLRS) Example 1B |
|---|---|---|---|
| BWP1/CC1 (reference BWP and CC) | TCI pool = {TCI ID1, TCI ID 2} | PLRS ID1, PLRS ID2 | PLRS ID1, PLRS ID2 |
| BWP2/CC2 | Reuse reference BWP and CC | Reuse reference BWP and CC | PLRS ID1, PLRS ID2 |
| BWP3/CC3 | Reuse reference BWP and CC | Reuse reference BWP and CC | PLRS ID1, PLRS ID2 |

Also as indicated, TCI state configurations of the common TCI state pool are associated with (e.g., include) certain PL RSs (e.g., PL RS ID 1 and PL RS ID 2 in Table 2). In some examples (e.g., in Example 2B), to determine the PL RS to use for uplink transmissions scheduled on BWP2/CC2 or BWP3/CC3, a UE may use the PL RS configured for the reference BWP/CC. For example, the PL RS of PL RS ID 1 and the PLRS of PL RS ID 2 are associated with TCI ID1 and TCI ID2 respectively, and configured on the reference BWP/CC. When a UE is scheduled with an uplink transmission on BWP2/CC2 or BWP3/CC3 and indicated with a TCI ID 1, the UE may apply the PL RS of PL RS ID1 configured on the BWP1/CC1 for the scheduled uplink transmission. In some examples (e.g., in Example 1B), to determine the PL RS to use for uplink transmissions scheduled on BWP2/CC2 or BWP3/CC3, a UE may use the PL RS configured for the target BWP/CC. For example, a PL RS of PL RS ID 1 and a PL RS of PL RS ID 2 are configured on each target BWP/CC (BWP2/CC2 and BWP3/CC3), and associated with TCI ID1 and TCI ID2 respectively. When a UE is scheduled with an uplink transmission on BWP2/CC2 and indicated with a TCI ID 1, the UE may apply the PL RS of PL RS ID 1 configured on the BWP2/CC2 for the scheduled uplink transmission.

In some examples, the same PL RS ID associated with different BWPs/CCs may refer to different PL RSs. For example, TCI ID1 may be associated with PL RS of PL RS ID1 in BWP1/CC1, and PL RS of PL RS ID1 in BWP2/CC2. As another example, TCI ID2 may be associated with PL RS of PL RS ID2 in BWP1/CC1, and PL RS of PL RS ID2 in BWP2/CC2. In this case, the PL RS of PL RS ID1 in BWP1/CC1 is not identical to PL RS of PL RS ID1 in BWP2/CC2. In addition, the PL RS of PL RS ID2 in BWP1/CC1 is not identical to PL RS of PL RS ID2 in BWP2/CC2.

Figure 12:
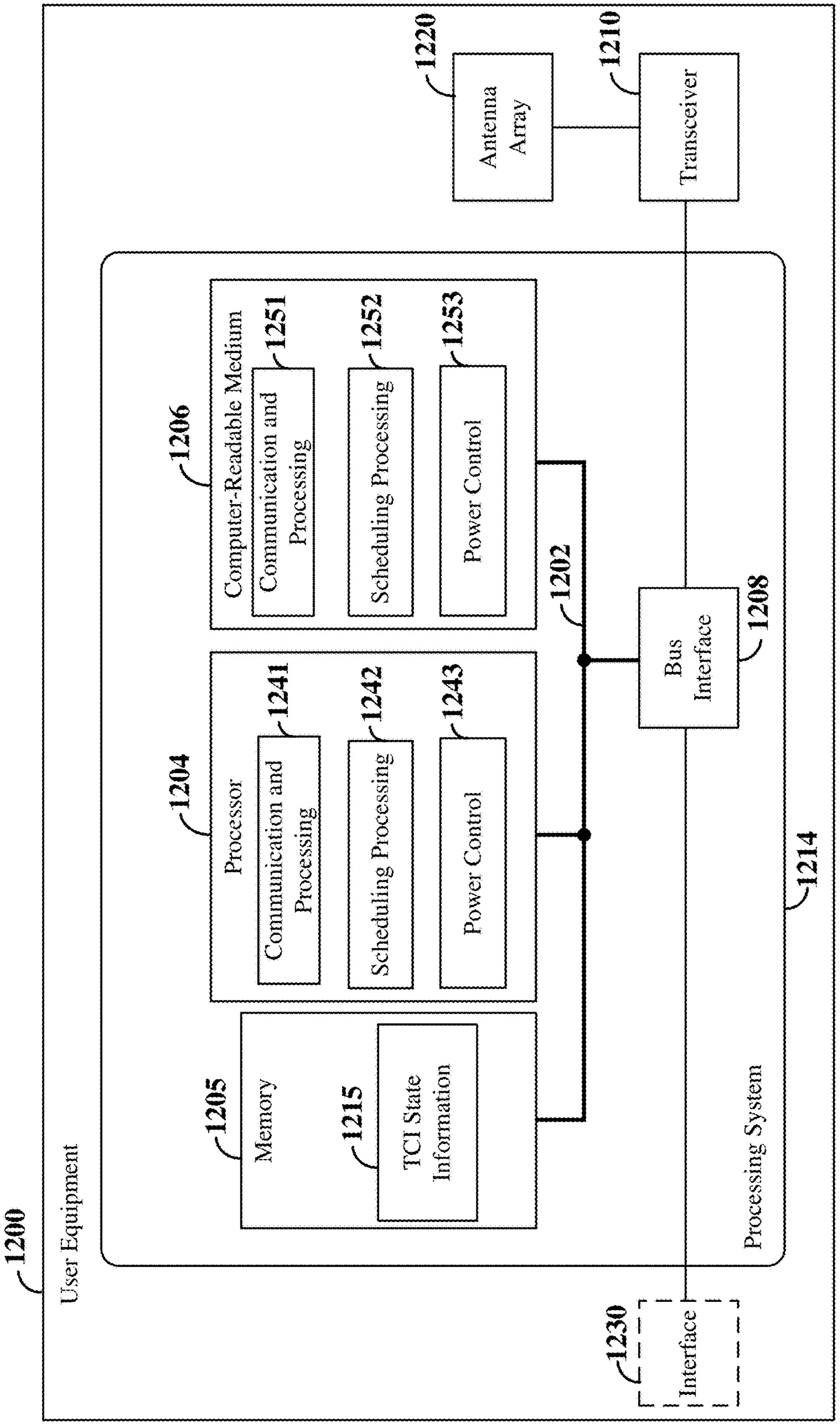
FIG. 12 is a block diagram conceptually illustrating an example of a hardware implementation for a user equipment employing a processing system according to some aspects.

FIG. 12 is a block diagram illustrating an example of a hardware implementation for a UE 1200 employing a processing system 1214. For example, the UE 1200 may be a device configured to wirelessly communicate with a base station, as discussed in any one or more of FIGS. 1-11. In some implementations, the UE 1200 may correspond to any of the UEs or scheduled entities shown in any one or more of FIGS. 1, 2, 4, 7, 8, 9, 10, and 11.

In accordance with various aspects of the disclosure, an element, or any portion of an element, or any combination of elements may be implemented with the processing system 1214. The processing system 1214 may include one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1200 may be configured to perform any one or more of the functions described herein. That is, the processor 1204, as utilized in a UE 1200, may be used to implement any one or more of the processes and procedures described herein.

The processor 1204 may in some instances be implemented via a baseband or modem chip and in other implementations, the processor 1204 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210 and an antenna array 1220, and an interface between the bus 1202 and an interface 1230. The transceiver 1210 provides a communication interface or means for communicating with various other apparatus over a wireless transmission medium. The interface 1230 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1230 may include a user interface (e.g., keypad, display, speaker, microphone, joystick). Of course, such a user interface is optional, and may be omitted in some examples, such as an IoT device.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may include TCI state information 1215 (e.g., associated with power control parameters) that may be used by the processor 1204 for transmission operations as discussed herein.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1200 may be configured to perform any one or more of the operations described herein (e.g., as described above in conjunction with FIGS. 1-11 and as described below in conjunction with FIGS. 13-14). In some aspects of the disclosure, the processor 1204, as utilized in the UE 1200, may include circuitry configured for various functions.

The processor 1204 may include communication and processing circuitry 1241. The communication and processing circuitry 1241 may be configured to communicate with a base station, such as a gNB. The communication and processing circuitry 1241 may include one or more hardware components that provide the physical structure that performs various processes related to wireless communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. In some examples, the communication and processing circuitry 1241 may include two or more transmit/receive chains. The communication and processing circuitry 1241 may further be configured to execute communication and processing software 1251 included on the computer-readable medium 1206 to implement one or more functions described herein.

In some implementations where the communication involves receiving information, the communication and processing circuitry 1241 may obtain information from a component of the UE 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving. In some examples, the communication and processing circuitry 1241 may include functionality for a means for decoding.

In some implementations where the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., a means for transmitting). In some examples, the communication and processing circuitry 1241 may include functionality for a means for encoding.

The processor 1204 may include scheduling processing circuitry 1242 configured to perform scheduling processing-related operations as discussed herein (e.g., as described above in conjunction with FIGS. 6-11). The scheduling processing circuitry 1242 may be configured to execute scheduling processing software 1252 included on the computer-readable medium 1206 to implement one or more functions described herein.

The processor 1204 may include power control circuitry 1243 configured to perform power control-related operations as discussed herein (e.g., as described above in conjunction with FIGS. 6-11). The power control circuitry 1243 may further be configured to execute power control software 1253 included on the computer-readable medium 1206 to implement one or more functions described herein.

Figure 13:
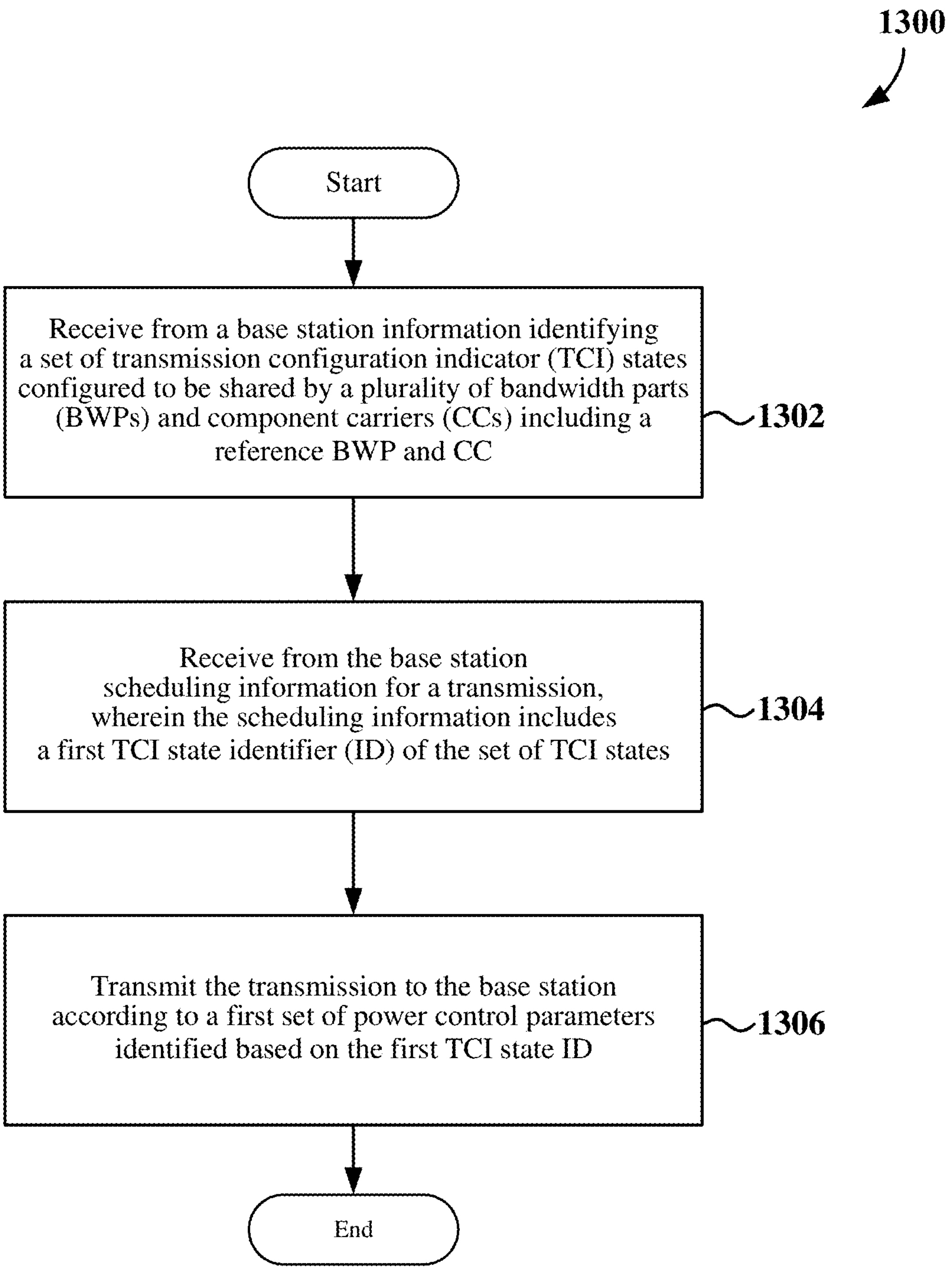
FIG. 13 is a flow chart illustrating an example of a transmission based on power control parameters according to some aspects.

FIG. 13 is a flow chart illustrating an example method 1300 for wireless communication according to some aspects. As described below, some or all illustrated features may be omitted in a particular implementation within the scope of the present disclosure, and some illustrated features may not be required for implementation of all examples. In some examples, the method 1300 may be carried out by the user equipment 1200 illustrated in FIG. 12 or by any suitable apparatus or means for carrying out the functions or algorithm described below.

At block 1302, a user equipment may receive from a base station information identifying a set of transmission configuration indicator (TCI) states configured to be shared by a plurality of bandwidth parts (BWPs) and component carriers (CCs) including a reference BWP and CC. For example, the scheduling processing circuitry 1242 together with the communication and processing circuitry 1241 and the transceiver 1210, shown and described above in connection with FIG. 12, may provide a means to receive from a base station information identifying a set of transmission configuration indicator (TCI) states configured to be shared by a plurality of bandwidth parts (BWPs) and component carriers (CCs) including a reference BWP and CC.

In some examples, the set of TCI states may include a first TCI state configuration associated with the first TCI state ID and associated with a second set of power control parameters, and a second TCI state configuration associated with a second TCI state ID and associated with a third set of power control parameters. In some examples, the set of TCI states may include a first TCI state configuration associated with the first TCI state ID and including a second set of power control parameters, and a second TCI state configuration associated with a second TCI state ID and including a third set of power control parameters.

At block 1304, a user equipment may receive from the base station scheduling information for a transmission, wherein the scheduling information include a first TCI state identifier (ID) for the set of TCI states. For example, the scheduling processing circuitry 1242 together with the communication and processing circuitry 1241 and the transceiver 1210, shown and described above in connection with FIG. 12, may provide a means to receive from the base station scheduling information for a transmission, wherein the scheduling information include a first TCI state identifier (ID) for the set of TCI states.

In some examples, the scheduling information configures a first BWP and CC of the plurality of BWPs and CCs for the transmission, and the first BWP and CC are configured to share the set of TCI states with the reference BWP and CC.

At block 1306, a user equipment may transmit the transmission to the base station according to a first set of power control parameters identified based on the first TCI state ID. For example, the power control circuitry 1243 together with the communication and processing circuitry 1241 and the transceiver 1210, shown and described above in connection with FIG. 12, may provide a means to transmit the transmission to the base station according to a first set of power control parameters identified based on the first TCI state ID.

In some examples, the first set of power control parameters may include at least one of a signal-to-noise ratio parameter, a path loss compensation factor, a closed loop index, or a combination thereof.

In some examples, the user equipment may identify the first set of power control parameters based on a mapping of the first TCI state ID to power control parameters specified for the reference BWP and CC. In some examples, the mapping is based on power control information included in the set of TCI states, or the mapping is a configured mapping.

In some examples, the first set of power control parameters may include power control parameters associated with the first TCI state ID on the reference BWP and CC.

In some examples, the user equipment may identify a power control parameter set from a first TCI state configuration of the set of TCI states, wherein the first TCI state configuration is identified by the first TCI state ID, and select the power control parameter set as the first set of power control parameters to use for the transmission.

In some examples, the scheduling information configures a first BWP and CC of the plurality of BWPs and CCs for the transmission. In some examples, the first set of power control parameters may include power control parameters associated with the first TCI state ID on the first BWP and CC. In some examples, the user equipment may determine a first power control parameter set identifier from a first TCI state configuration of the set of TCI states, wherein the first TCI state configuration is identified by the first TCI state ID, select a second set of power control parameters associated with the first power control parameter set identifier for the first BWP and CC, and use the second set of power control parameters as the first set of power control parameters for the transmission.

Figure 14:
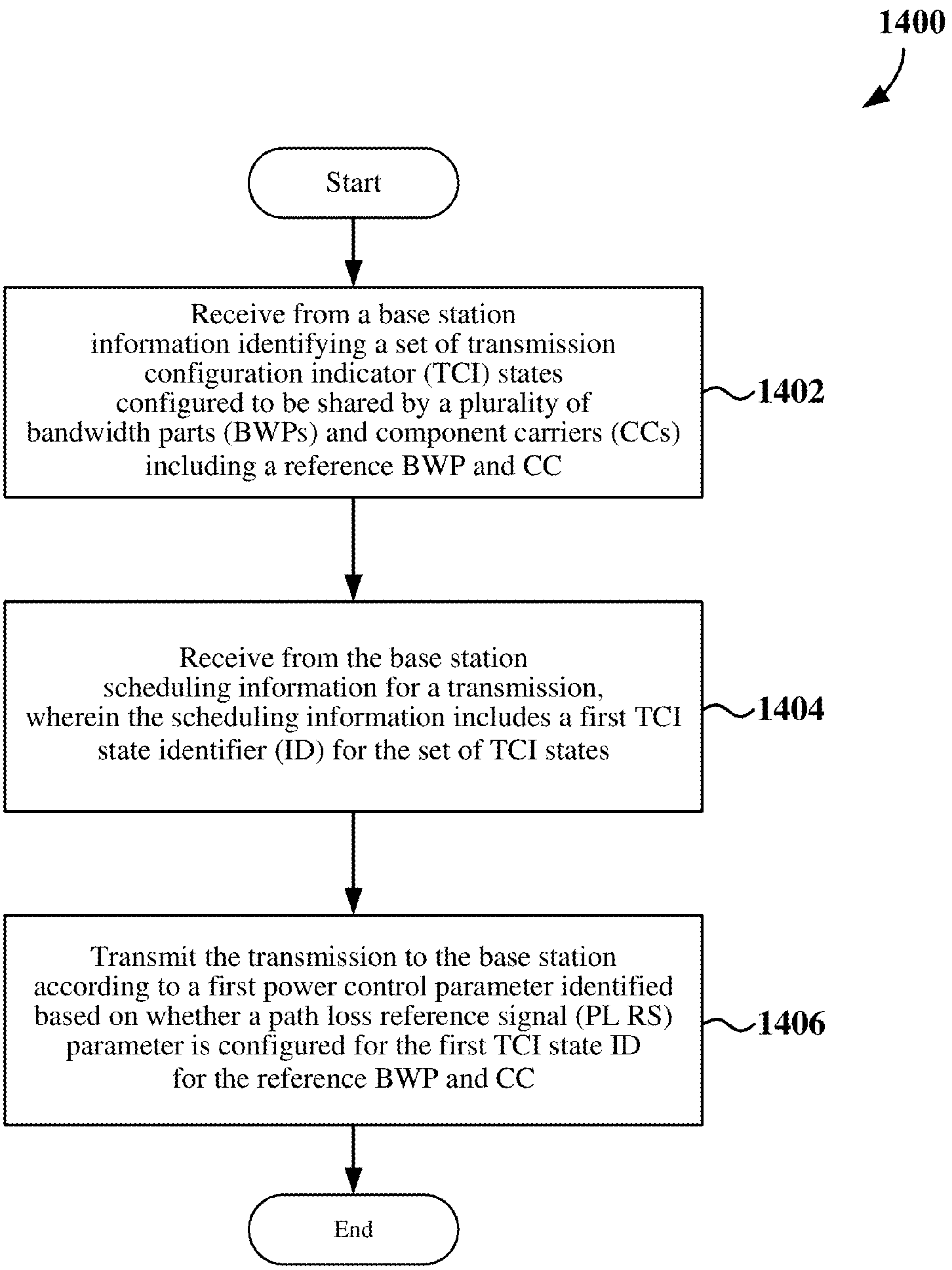
FIG. 14 is a flow chart illustrating an example of a transmission based on a path loss reference signal parameter according to some aspects.

FIG. 14 is a flow chart illustrating an example method 1400 for wireless communication according to some aspects. As described below, some or all illustrated features may be omitted in a particular implementation within the scope of the present disclosure, and some illustrated features may not be required for implementation of all examples. In some examples, the method 1400 may be carried out by the user equipment 1200 illustrated in FIG. 12 or by any suitable apparatus or means for carrying out the functions or algorithm described below.

At block 1402, a user equipment may receive from a base station information identifying a set of transmission configuration indicator (TCI) states configured to be shared by a plurality of bandwidth parts (BWPs) and component carriers (CCs) including a reference BWP and CC. For example, the scheduling processing circuitry 1242 together with the communication and processing circuitry 1241 and the transceiver 1210, shown and described above in connection with FIG. 12, may provide a means to receive from a base station information identifying a set of transmission configuration indicator (TCI) states configured to be shared by a plurality of bandwidth parts (BWPs) and component carriers (CCs) including a reference BWP and CC.

In some examples, the set of TCI states may include a first TCI state configuration associated with the first TCI state ID and associated with a second PL RS parameter, and a second TCI state configuration associated with a second TCI state ID and associated with a third PL RS parameter. In some examples, the set of TCI states may include a first TCI state configuration associated with the first TCI state ID and including a second PL RS parameter, and a second TCI state configuration associated with a second TCI state ID and including a third PL RS parameter.

At block 1404, a user equipment may receive from the base station scheduling information for a transmission, wherein the scheduling information includes a first TCI state identifier (ID) for the set of TCI states. For example, the scheduling processing circuitry 1242 together with the communication and processing circuitry 1241 and the transceiver 1210, shown and described above in connection with FIG. 12, may provide a means to receive from the base station scheduling information for a transmission.

In some examples, the scheduling information configures a first BWP and CC of the plurality of BWPs and CCs for the transmission, and the first BWP and CC are configured to share the set of TCI states with the reference BWP and CC.

At block 1406, a user equipment may transmit the transmission to the base station according to a first power control parameter identified based on whether a path loss reference signal (PL RS) parameter is configured for the first TCI state ID for the reference BWP and CC. For example, the power control circuitry 1243 together with the communication and processing circuitry 1241 and the transceiver 1210, shown and described above in connection with FIG. 12, may provide a means to transmit the transmission to the base station according to a first power control parameter identified based on whether a path loss reference signal (PL RS) parameter is configured for the first TCI state ID for the reference BWP and CC.

In some examples, the first power control parameter may include a PL RS for uplink power control.

In some examples, the user equipment may select a first PL RS associated with a synchronization signal block (SSB) when the PL RS parameter is not configured for the first TCI state ID for the reference BWP and CC.

In some examples, the user equipment may select a first PL RS associated with one of the plurality of BWPs and CCs when the PL RS parameter is configured for the first TCI state ID for the reference BWP and CC.

In some examples, the scheduling information configures a first BWP and CC of the plurality of BWPs and CCs for the transmission, and the user equipment may select a first PL RS associated with the first BWP and CC when the PL RS parameter is configured for the first TCI state ID for the reference BWP and CC. In some examples, the user equipment may select the first PL RS associated with the first BWP and CC based on a received indicator, or select the first PL RS associated with the first BWP and CC based on a rule.

In some examples, the user equipment may select a first PL RS associated with the reference BWP and CC when the PL RS parameter is configured for the first TCI state ID for the reference BWP and CC. In some examples, the user equipment may select the first PL RS associated with the reference BWP and CC based on a received indicator, or select the first PL RS associated with the reference BWP and CC based on a rule.

In some examples, the reference BWP and CC are associated with a primary cell, a primary secondary cell, or a physical uplink control channel secondary cell.

In some examples, the user equipment may identify the first power control parameter based on a mapping of the first TCI state ID to power control parameters specified for the reference BWP and CC.

In some examples, the user equipment may identify an RS ID from a first TCI state configuration of the set of TCI states, wherein the first TCI state configuration is identified by the first TCI state ID, and select the first power control parameter for the transmission based on the RS ID.

In some examples, the scheduling information configures a first BWP and CC of the plurality of BWPs and CCs for the transmission. In some examples, the user equipment may determine a first RS ID from a first TCI state configuration of the set of TCI states, wherein the first TCI state configuration is identified by the first TCI state ID, select a second power control parameter associated with the RS ID for the first BWP and CC, and use the second power control parameter as the first power control parameter for the transmission.

In one configuration, the user equipment 1200 includes means for receiving from a base station information identifying a set of transmission configuration indicator (TCI) states configured to be shared by a plurality of bandwidth parts (BWPs) and component carriers (CCs) including a reference BWP and CC, means for receiving from the base station scheduling information for a transmission, wherein the scheduling information include a first TCI state identifier (ID) for the set of TCI states, and means for transmitting the transmission to the base station according to a first set of power control parameters identified based on the first TCI state ID. In one configuration, the user equipment 1200 includes means for receiving from a base station information identifying a set of transmission configuration indicator (TCI) states configured to be shared by a plurality of bandwidth parts (BWPs) and component carriers (CCs) including a reference BWP and CC, means for receiving from the base station scheduling information for a transmission, wherein the scheduling information includes a first TCI state identifier (ID) for the set of TCI states, and means for transmitting the transmission to the base station according to a first power control parameter identified based on whether a path loss reference signal (PL RS) parameter is configured for the first TCI state ID for the reference BWP and CC. In one aspect, the aforementioned means may be the processor 1204 shown in FIG. 12 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable medium 1206, or any other suitable apparatus or means described in any one or more of FIGS. 1, 2, 4, and 7-12, and utilizing, for example, the methods and/or algorithms described herein in relation to FIGS. 13 and 14.

The methods shown in FIGS. 13 and 14 may include additional aspects, such as any single aspect or any combination of aspects described below and/or in connection with one or more other processes described elsewhere herein. The following provides an overview of several aspects of the present disclosure.

Aspect 1: A method for wireless communication at a user equipment, the method comprising: receiving from a base station information identifying a set of transmission configuration indicator (TCI) states configured to be shared by a plurality of bandwidth parts (BWPs) and component carriers (CCs) including a reference BWP and CC; receiving from the base station scheduling information for a transmission, wherein the scheduling information include a first TCI state identifier (ID) for the set of TCI states; and transmitting the transmission to the base station according to a first set of power control parameters identified based on the first TCI state ID.

Aspect 2: The method of aspect 1, wherein the first set of power control parameters comprise at least one of: a signal-to-noise ratio parameter, a path loss compensation factor, a closed loop index, or a combination thereof.

Aspect 3: The method of aspect 1 or 2, further comprising: identifying the first set of power control parameters based on a mapping of the first TCI state ID to power control parameters specified for the reference BWP and CC.

Aspect 4: The method of aspect 3, wherein: the mapping is based on power control information included in the set of TCI states; or the mapping is a configured mapping.

Aspect 5: The method of any of aspects 1 through 4, wherein the set of TCI states comprises: a first TCI state configuration associated with the first TCI state ID and associated with a second set of power control parameters; and a second TCI state configuration associated with a second TCI state ID and associated with a third set of power control parameters.

Aspect 6: The method of any of aspects 1 through 4, wherein the set of TCI states comprises: a first TCI state configuration associated with the first TCI state ID and including a second set of power control parameters; and a second TCI state configuration associated with a second TCI state ID and including a third set of power control parameters.

Aspect 7: The method of any of aspects 1 through 6, wherein: the scheduling information configures a first BWP and CC of the plurality of BWPs and CCs for the transmission; and the first BWP and CC are configured to share the set of TCI states with the reference BWP and CC.

Aspect 8: The method of any of aspects 1 through 7, wherein the first set of power control parameters comprises: power control parameters associated with the first TCI state ID on the reference BWP and CC.

Aspect 9: The method of any of aspects 1 through 8, further comprising: identifying a power control parameter set from a first TCI state configuration of the set of TCI states, wherein the first TCI state configuration is identified by the first TCI state ID; and selecting the power control parameter set as the first set of power control parameters to use for the transmission.

Aspect 10: The method of any of aspects 1 through 9, wherein: the scheduling information configures a first BWP and CC of the plurality of BWPs and CCs for the transmission.

Aspect 11: The method of aspect 10, wherein: the first set of power control parameters comprises power control parameters associated with the first TCI state ID on the first BWP and CC.

Aspect 12: The method of aspect 10, further comprising: determining a first power control parameter set identifier from a first TCI state configuration of the set of TCI states, wherein the first TCI state configuration is identified by the first TCI state ID; selecting a second set of power control parameters associated with the first power control parameter set identifier for the first BWP and CC; and using the second set of power control parameters as the first set of power control parameters for the transmission.

Aspect 14: A method for wireless communication at a user equipment, the method comprising: receiving from a base station information identifying a set of transmission configuration indicator (TCI) states configured to be shared by a plurality of bandwidth parts (BWPs) and component carriers (CCs) including a reference BWP and CC; receiving from the base station scheduling information for a transmission, wherein the scheduling information includes a first TCI state identifier (ID) for the set of TCI states; and transmitting the transmission to the base station according to a first power control parameter identified based on whether a path loss reference signal (PL RS) parameter is configured for the first TCI state ID for the reference BWP and CC.

Aspect 15: The method of aspect 14, wherein the first power control parameter comprises a PL RS for uplink power control.

Aspect 16: The method of any of aspects 14 through 15, further comprising: selecting a first PL RS associated with a synchronization signal block (SSB) when the PL RS parameter is not configured for the first TCI state ID for the reference BWP and CC.

Aspect 17: The method of any of aspects 14 through 15, further comprising: selecting a first PL RS associated with one of the plurality of BWPs and CCs when the PL RS parameter is configured for the first TCI state ID for the reference BWP and CC.

Aspect 18: The method of any of aspects 14 through 17, wherein: the scheduling information configures a first BWP and CC of the plurality of BWPs and CCs for the transmission; and the method further comprises selecting a first PL RS associated with the first BWP and CC when the PL RS parameter is configured for the first TCI state ID for the reference BWP and CC.

Aspect 19: The method of aspect 18, further comprising: selecting the first PL RS associated with the first BWP and CC based on a received indicator; or selecting the first PL RS associated with the first BWP and CC based on a rule.

Aspect 20: The method of any of aspects 14 through 17, further comprising: selecting a first PL RS associated with the reference BWP and CC when the PL RS parameter is configured for the first TCI state ID for the reference BWP and CC.

Aspect 21: The method of aspect 20, further comprising: selecting the first PL RS associated with the reference BWP and CC based on a received indicator; or selecting the first PL RS associated with the reference BWP and CC based on a rule.

Aspect 22: The method of any of aspects 16 through 21, wherein the reference BWP and CC are associated with a primary cell, a primary secondary cell, or a physical uplink control channel secondary cell.

Aspect 23: The method of any of aspects 14 through 15, further comprising: identifying the first power control parameter based on a mapping of the first TCI state ID to power control parameters specified for the reference BWP and CC.

Aspect 24: The method of any of aspects 14 through 23, wherein the set of TCI states comprises: a first TCI state configuration associated with the first TCI state ID and associated with a second PL RS parameter; and a second TCI state configuration associated with a second TCI state ID and associated with a third PL RS parameter.

Aspect 25: The method of any of aspects 14 through 23, wherein the set of TCI states comprises: a first TCI state configuration associated with the first TCI state ID and including a second PL RS parameter; and a second TCI state configuration associated with a second TCI state ID and including a third PL RS parameter.

Aspect 26: The method of any of aspects 14 through 25, wherein: the scheduling information configures a first BWP and CC of the plurality of BWPs and CCs for the transmission; and the first BWP and CC are configured to share the set of TCI states with the reference BWP and CC.

Aspect 27: The method of any of aspects 14 through 15, further comprising: identifying an RS ID from a first TCI state configuration of the set of TCI states, wherein the first TCI state configuration is identified by the first TCI state ID; and selecting the first power control parameter for the transmission based on the RS ID.

Aspect 28: The method of any of aspects 14 through 27, wherein: the scheduling information configures a first BWP and CC of the plurality of BWPs and CCs for the transmission.

Aspect 29: The method of any of aspects 14 through 15, further comprising: determining a first RS ID from a first TCI state configuration of the set of TCI states, wherein the first TCI state configuration is identified by the first TCI state ID; selecting a second power control parameter associated with the RS ID for the first BWP and CC; and using the second power control parameter as the first power control parameter for the transmission.

Aspect 30: A user equipment comprising: a transceiver configured to communicate with a radio access network, a memory, and a processor communicatively coupled to the transceiver and the memory, wherein the processor and the memory are configured to perform any one of aspects 1 through 12.

Aspect 31: An apparatus configured for wireless communication comprising at least one means for performing any one of aspects 1 through 12.

Aspect 32: A non-transitory computer-readable medium storing computer-executable code, comprising code for causing an apparatus to perform any one of aspects 1 through 12.

Aspect 33: A user equipment comprising: a transceiver, a memory, and a processor communicatively coupled to the transceiver and the memory, wherein the processor and the memory are configured to perform any one of aspects 14 through 29.

Aspect 34: An apparatus configured for wireless communication comprising at least one means for performing any one of aspects 14 through 29.

Aspect 35: A non-transitory computer-readable medium storing computer-executable code, comprising code for causing an apparatus to perform any one of aspects 14 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term “determining” may include, for example, ascertaining, resolving, selecting, choosing, establishing, calculating, computing, processing, deriving, investigating, looking up (e.g., looking up in a table, a database or another data structure), and the like. Also, “determining” may include receiving (e.g., receiving information), accessing (e.g., accessing data in a memory), and the like.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 7, 8, 9, 10, 11, and 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:

one or more memories that store processor-executable code; and one or more processors configured to execute the processor-executable code and cause the user equipment to:

receive, from a network entity, information identifying a set of transmission configuration indicator (TCI) states configured to be shared by a plurality of bandwidth parts (BWPs) and component carriers (CCs), the plurality of BWPs and CCs including a designated reference BWP and CC;

receive, from the network entity, scheduling information for a transmission via a first BWP and CC of the plurality of BWPs and CCs, wherein the scheduling information includes a first TCI state identifier (ID) that identifies a first TCI state of the set of TCI states; and transmit the transmission to the network entity via the first BWP and CC according to a first set of power control parameters configured for the designated reference BWP and CC for the first TCI state ID.

2. The user equipment of claim 1, wherein the first set of power control parameters comprise at least one of: a signal-to-noise ratio parameter, a path loss compensation factor, a closed loop index, or a combination thereof.

3. The user equipment of claim 1, wherein the one or more processors are further configured to execute the processor-executable code and cause the user equipment to:

identify the first set of power control parameters based on a mapping of the first TCI state ID to power control parameters specified for the reference BWP and CC.

4. The user equipment of claim 3, wherein:

the mapping is based on power control information included in the set of TCI states; or the mapping is a configured mapping.

5. The user equipment of claim 1, wherein the set of TCI states comprises:

a first TCI state configuration associated with the first TCI state ID and associated with a second set of power control parameters; and a second TCI state configuration associated with a second TCI state ID and associated with a third set of power control parameters.

6. The user equipment of claim 1, wherein the set of TCI states comprises:

a first TCI state configuration associated with the first TCI state ID and including a second set of power control parameters; and a second TCI state configuration associated with a second TCI state ID and including a third set of power control parameters.

7. The user equipment of claim 1, wherein:

the scheduling information configures the first BWP and CC of the plurality of BWPs and CCs for the transmission; and the first BWP and CC are configured to share the set of TCI states with the reference BWP and CC.

8. The user equipment of claim 1, wherein the first set of power control parameters comprises:

power control parameters associated with the first TCI state ID on the reference BWP and CC.

9. The user equipment of claim 1, wherein the one or more processors are further configured to execute the processor-executable code and cause the user equipment to:

identify a power control parameter set from a first TCI state configuration of the set of TCI states, wherein the first TCI state configuration is identified by the first TCI state ID; and select the power control parameter set as the first set of power control parameters to use for the transmission.

10. The user equipment of claim 1, wherein:

the scheduling information configures the first BWP and CC of the plurality of BWPs and CCs for the transmission.

11. The user equipment of claim 10, wherein:

the first set of power control parameters comprises power control parameters associated with the first TCI state ID on the first BWP and CC.

12. The user equipment of claim 10, wherein the one or more processors are further configured to execute the processor-executable code and cause the user equipment to:

determine a first power control parameter set identifier from a first TCI state configuration of the set of TCI states, wherein the first TCI state configuration is identified by the first TCI state ID;

select a second set of power control parameters associated with the first power control parameter set identifier for the first BWP and CC; and use the second set of power control parameters as the first set of power control parameters for the transmission.

13. The user equipment of claim 1, wherein the first set of power control parameters are selected for the transmission based on power control parameters being unspecified for the first BWP and CC.

14. A method for wireless communication at a user equipment, the method comprising:

receiving, from a network entity, information identifying a set of transmission configuration indicator (TCI) states configured to be shared by a plurality of bandwidth parts (BWPs) and component carriers (CCs), the plurality of BWPs and CCs including a designated reference BWP and CC;

receiving, from the network entity, scheduling information for a transmission via a first BWP and CC of the plurality of BWPs and CCs, wherein the scheduling information includes a first TCI state identifier (ID) that identifies a first TCI state of the set of TCI states; and transmitting the transmission to the network entity via the first BWP and CC according to a first set of power control parameters configured for the designated reference BWP and CC for the first TCI state ID.

15. A user equipment, comprising:

one or more memories that store processor-executable code; and one or more processors configured to execute the processor-executable code and cause the user equipment to:

receive, from a network entity, information identifying a set of transmission configuration indicator (TCI) states configured to be shared by a plurality of bandwidth parts (BWPs) and component carriers (CCs), the plurality of BWPs and CCs including a designated reference BWP and CC;

receive, from the network entity, scheduling information for a transmission via a first BWP and CC of the plurality of BWPs and CCs, wherein the scheduling information includes a first TCI state identifier (ID) that identifies a first TCI state of the set of TCI states; and transmit the transmission to the network entity via the first BWP and CC according to a first power control parameter identified based on a configuration of a path loss reference signal (PL RS) parameter for the designated reference BWP and CC for the first TCI state ID.

16. The user equipment of claim 15, wherein the first power control parameter comprises a PL RS for uplink power control.

17. The user equipment of claim 15, wherein the one or more processors are further configured to execute the processor-executable code and cause the user equipment to:

select a first PL RS associated with a synchronization signal block (SSB) when the PL RS parameter is not configured for the first TCI state ID for the reference BWP and CC.

18. The user equipment of claim 15, wherein the one or more processors are further configured to execute the processor-executable code and cause the user equipment to:

select a first PL RS associated with one of the plurality of BWPs and CCs when the PL RS parameter is configured for the first TCI state ID for the reference BWP and CC.

19. The user equipment of claim 15, wherein:

the scheduling information configures the first BWP and CC of the plurality of BWPs and CCs for the transmission; and the one or more processors are further configured to execute the processor-executable code and cause the user equipment to select a first PL RS associated with the first BWP and CC when the PL RS parameter is configured for the first TCI state ID for the reference BWP and CC.

20. The user equipment of claim 19, wherein the one or more processors are further configured to execute the processor-executable code and cause the user equipment to:

select the first PL RS associated with the first BWP and CC based on a received indicator; or select the first PL RS associated with the first BWP and CC based on a rule.

21. The user equipment of claim 15, wherein the one or more processors are further configured to execute the processor-executable code and cause the user equipment to:

select a first PL RS associated with the reference BWP and CC when the PL RS parameter is configured for the first TCI state ID for the reference BWP and CC.

22. The user equipment of claim 21, wherein the one or more processors are further configured to execute the processor-executable code and cause the user equipment to:

select the first PL RS associated with the reference BWP and CC based on a received indicator; or select the first PL RS associated with the reference BWP and CC based on a rule.

23. The user equipment of claim 15, wherein the reference BWP and CC are associated with a primary cell, a primary secondary cell, or a physical uplink control channel secondary cell.

24. The user equipment of claim 15, wherein the one or more processors are further configured to execute the processor-executable code and cause the user equipment to:

identify the first power control parameter based on a mapping of the first TCI state ID to power control parameters specified for the reference BWP and CC.

25. The user equipment of claim 15, wherein the set of TCI states comprises:

a first TCI state configuration associated with the first TCI state ID and associated with a second PL RS parameter; and a second TCI state configuration associated with a second TCI state ID and associated with a third PL RS parameter.

26. The user equipment of claim 15, wherein the set of TCI states comprises:

a first TCI state configuration associated with the first TCI state ID and including a second PL RS parameter; and a second TCI state configuration associated with a second TCI state ID and including a third PL RS parameter.

27. The user equipment of claim 15, wherein:

the scheduling information configures the first BWP and CC of the plurality of BWPs and CCs for the transmission; and the first BWP and CC are configured to share the set of TCI states with the reference BWP and CC.

28. The user equipment of claim 15, wherein the one or more processors are further configured to execute the processor-executable code and cause the user equipment to:

identify an RS ID from a first TCI state configuration of the set of TCI states, wherein the first TCI state configuration is identified by the first TCI state ID; and select the first power control parameter for the transmission based on the RS ID.

29. The user equipment of claim 15, wherein the one or more processors are further configured to execute the processor-executable code and cause the user equipment to:

determine a first RS ID from a first TCI state configuration of the set of TCI states, wherein the first TCI state configuration is identified by the first TCI state ID;

select a second power control parameter associated with the RS ID for the first BWP and CC; and use the second power control parameter as the first power control parameter for the transmission.

30. A method for wireless communication at a user equipment, the method comprising:

receiving, from a network entity, information identifying a set of transmission configuration indicator (TCI) states configured to be shared by a plurality of bandwidth parts (BWPs) and component carriers (CCs), the plurality of BWPs and CCs including a designated reference BWP and CC;

receiving, from the network entity, scheduling information for a transmission via a first BWP and CC of the plurality of BWPs and CCs, wherein the scheduling information includes a first TCI state identifier (ID) that identifies a first TCI state of the set of TCI states; and transmitting the transmission to the network entity via the first BWP and CC according to a first power control parameter identified based on a configuration of a path loss reference signal (PL RS) parameter for the designated reference BWP and CC for the first TCI state ID.

* * * * *